US012625993B2

(12) United States Patent
Johnson et al.

(10) Patent No.:   US 12,625,993 B2
(45) Date of Patent:        May 12, 2026

(54) PROVIDING A GRAPHICAL REPRESENTATION OF ANOMALOUS EVENTS

(71) Applicant: Cohesity, Inc., San Jose, CA (US)

(72) Inventors: Colin Scott Johnson, San Francisco, CA (US); Mingran Li, San Jose, CA (US)

(73) Assignee: Cohesity, Inc., Santa Clara, CA (US)

( * ) Notice: Subject to any disclaimer, the term of this patent is extended or adjusted under 35 U.S.C. 154(b) by 21 days.

(21) Appl. No.: 18/537,095

(22) Filed: Dec. 12, 2023

(65) Prior Publication Data

US 2024/0126910 A1        Apr. 18, 2024

Related U.S. Application Data

(63) Continuation of application No. 17/501,617, filed on Oct. 14, 2021, now Pat. No. 11,893,125.

(51) Int. Cl.
   *G06F 21/62*        (2013.01)
   *G06F 3/0482*        (2013.01)
   *G06F 21/57*        (2013.01)
(52) U.S. Cl.
   CPC ........ *G06F 21/6218* (2013.01); *G06F 3/0482* (2013.01); *G06F 21/577* (2013.01); *G06F 2221/2101* (2013.01)
(58) Field of Classification Search
   CPC .. G06F 21/6218; G06F 3/0482; G06F 21/577; G06F 2221/2101
   See application file for complete search history.

(56) References Cited

U.S. PATENT DOCUMENTS

| | | | |
|---|---|---|---|
| 9,009,825 B1 | 4/2015 | Chang | |
| 9,519,698 B1 | 12/2016 | Lee | |
| 9,537,880 B1 | 1/2017 | Jones | |
| 9,697,100 B2 | 7/2017 | Puri | |
| 9,773,112 B1 * | 9/2017 | Rathor | G06F 21/554 |
| 10,496,817 B1 * | 12/2019 | Furbish | G06F 21/554 |
| 10,671,726 B1 * | 6/2020 | Paithane | H04L 63/1416 |
| 10,841,338 B1 | 11/2020 | Lin | |
| 11,422,882 B1 | 8/2022 | Chhabra | |
| 11,526,425 B1 | 12/2022 | Karis | |
| 11,593,639 B1 | 2/2023 | Garg | |
| 11,593,669 B1 | 2/2023 | Chhabra | |
| 11,893,125 B2 | 2/2024 | Johnson et al. | |
| 2003/0220940 A1 | 11/2003 | Futoransky | |

(Continued)

OTHER PUBLICATIONS

Prosecution History from U.S. Appl. No. 17/501,617, now issued U.S. Pat. 11,893,125, dated Dec. 21, 2022 through Oct. 6, 2023, 47 pp.

*Primary Examiner* — Oleg Survillo
(74) *Attorney, Agent, or Firm* — Shumaker & Sieffert, P.A.

(57)        ABSTRACT

One or more event logs are received. The one or more event logs are analyzed using a plurality of models to detect one or more anomalous events. A graphical representation of risk entities associated with at least one of the one or more detected anomalous events is provided. A visual representation of automatically detected relationships between the risk entities associated with the at least one of the one or more detected anomalous events is provided in the graphical representation. Indications of measures of anomaly associated with detected anomalous events are provided for the associated risk entities.

18 Claims, 23 Drawing Sheets

(56) References Cited

U.S. PATENT DOCUMENTS

| | | | | |
|---|---|---|---|---|
| 2013/0298243 | A1* | 11/2013 | Kumar | H04L 63/1408 |
| | | | | 726/25 |
| 2015/0142627 | A1* | 5/2015 | Lee | G06Q 30/0185 |
| | | | | 705/35 |
| 2016/0142435 | A1* | 5/2016 | Bernstein | H04L 63/1425 |
| | | | | 726/23 |
| 2017/0060656 | A1 | 3/2017 | Bhattacharya | |
| 2017/0063899 | A1* | 3/2017 | Muddu | G06N 5/022 |
| 2017/0111381 | A1 | 4/2017 | Jones | |
| 2017/0192872 | A1 | 7/2017 | Awad | |
| 2017/0193239 | A1 | 7/2017 | Chari | |
| 2017/0230229 | A1 | 8/2017 | Sasturkar | |
| 2017/0262852 | A1* | 9/2017 | Florimond | G06N 3/08 |
| 2018/0167402 | A1 | 6/2018 | Scheidler | |
| 2018/0270265 | A1 | 9/2018 | Sage | |
| 2018/0288074 | A1* | 10/2018 | Thayer | H04L 63/1425 |
| 2019/0052660 | A1 | 2/2019 | Cassidy | |
| 2019/0228296 | A1 | 7/2019 | Gefen | |
| 2019/0342307 | A1 | 11/2019 | Gamble | |
| 2020/0274894 | A1* | 8/2020 | Argoeti | H04L 63/1433 |
| 2021/0004704 | A1 | 1/2021 | Dang | |
| 2021/0021592 | A1 | 1/2021 | Wright | |
| 2021/0103488 | A1 | 4/2021 | Wang | |
| 2021/0117232 | A1 | 4/2021 | Sriharsha | |
| 2021/0211443 | A1 | 7/2021 | Sullivan | |
| 2021/0273957 | A1 | 9/2021 | Boyer | |
| 2021/0311542 | A1* | 10/2021 | Brown | G06F 3/017 |
| 2021/0389997 | A1 | 12/2021 | Ibrahim | |
| 2021/0406106 | A1 | 12/2021 | Moss | |
| 2021/0406112 | A1 | 12/2021 | Moss | |
| 2022/0107859 | A1 | 4/2022 | Choudhary | |
| 2022/0141188 | A1 | 5/2022 | Apger | |
| 2022/0269577 | A1 | 8/2022 | Gechman | |
| 2022/0334904 | A1 | 10/2022 | Chesneau | |
| 2022/0374809 | A1 | 11/2022 | Gaspar | |
| 2023/0007023 | A1 | 1/2023 | Andrabi | |
| 2023/0025718 | A1* | 1/2023 | Varnavas | G06F 11/302 |
| 2025/0071011 | A1* | 2/2025 | Hawkinson | H04L 41/069 |

* cited by examiner

200

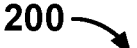

Obtain One Or More Event Logs — 202

Store The One Or More Event Logs — 204

Analyze The One Or More Event Logs — 206

Provide A Graphical Representation Of Risk Entities Associated With One Or More Detected Anomalous Events — 208

Receive A Selection Of A Graphical User Interface Item Corresponding To One Of The Risk Entities — 210

Re-Analyze The One Or More Event Logs Based On The Selected Graphical User Interface Item — 212

Update The Graphical Representation Of Risk Entities Associated With One Or More Detected Anomalous Events — 214

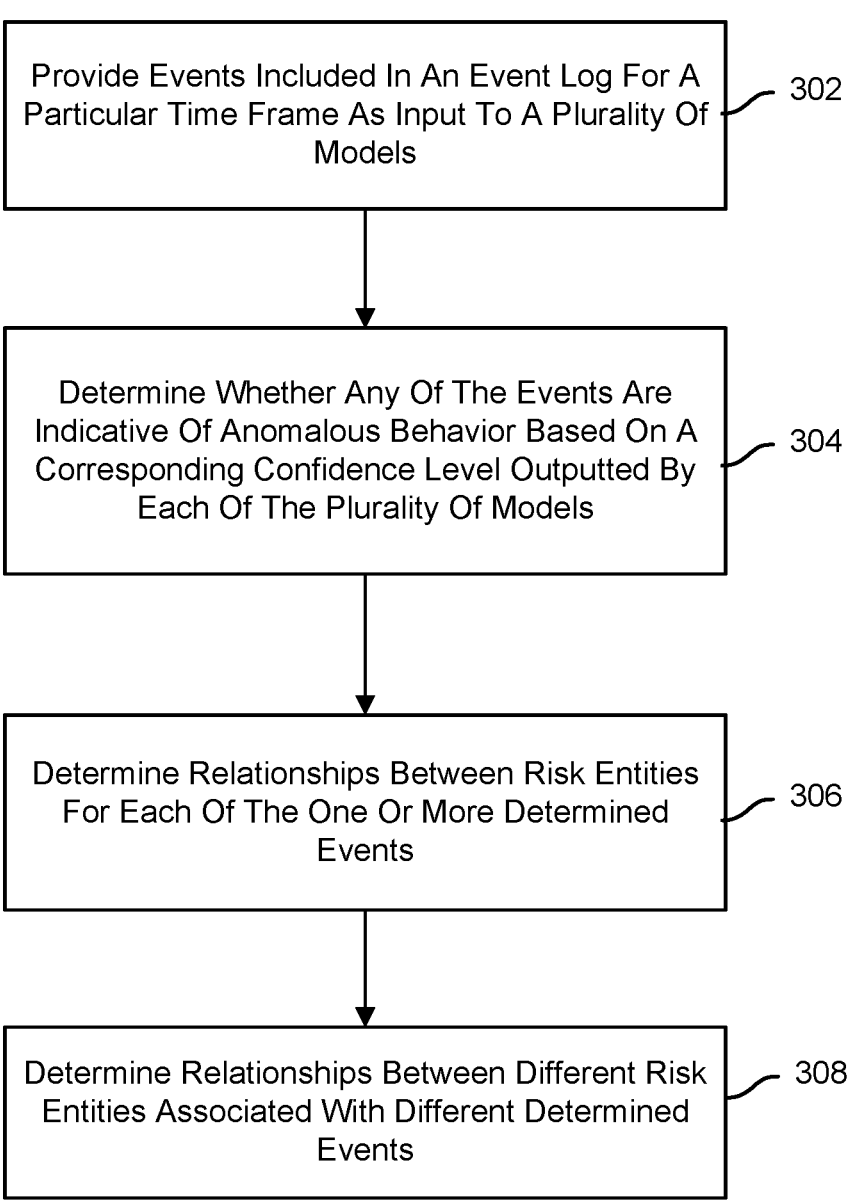

Provide Events Included In An Event Log For A Particular Time Frame As Input To A Plurality Of Models — 302

Determine Whether Any Of The Events Are Indicative Of Anomalous Behavior Based On A Corresponding Confidence Level Outputted By Each Of The Plurality Of Models — 304

Determine Relationships Between Risk Entities For Each Of The One Or More Determined Events — 306

Determine Relationships Between Different Risk Entities Associated With Different Determined Events — 308

FIG. 3

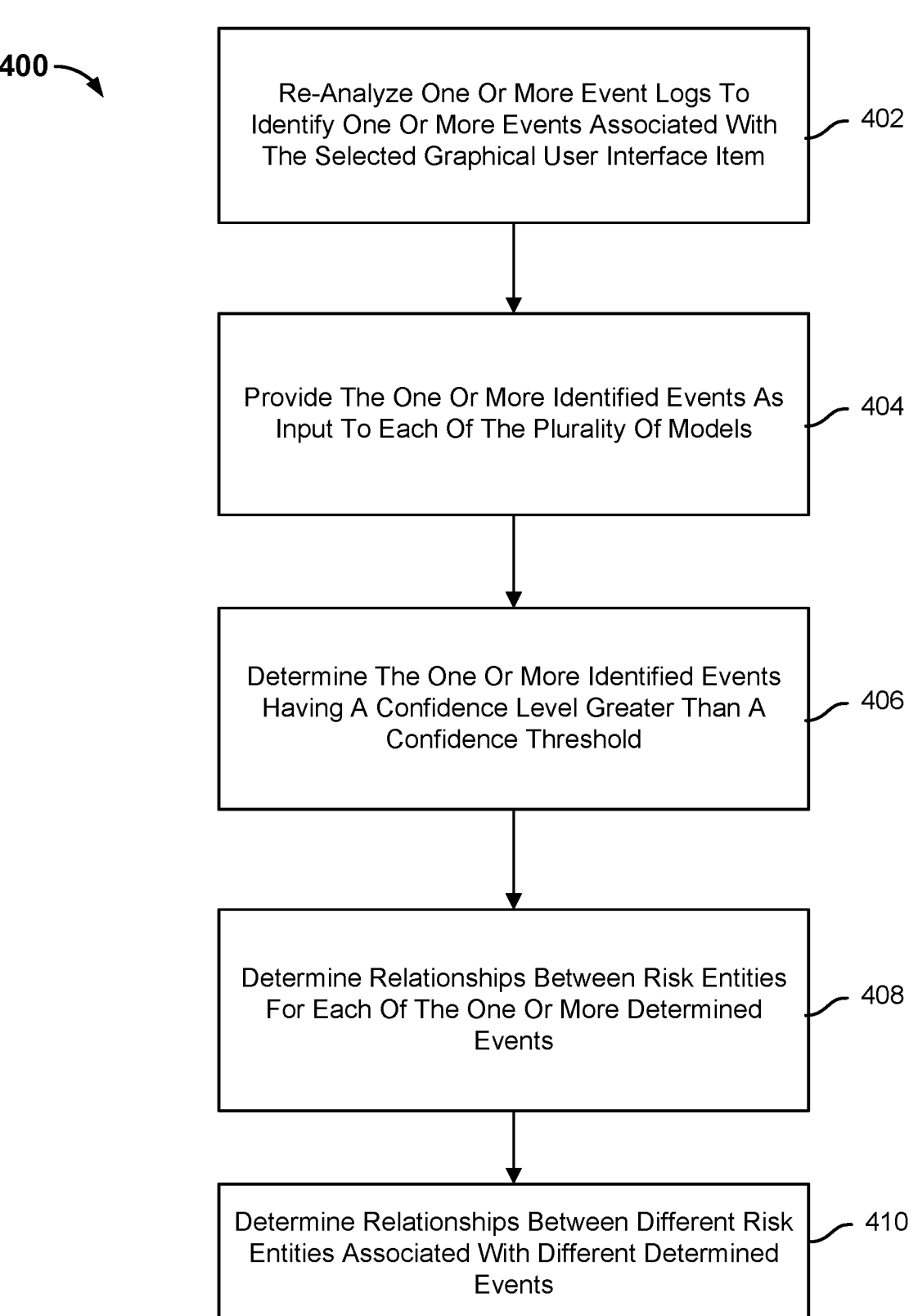

400

Re-Analyze One Or More Event Logs To Identify One Or More Events Associated With The Selected Graphical User Interface Item — 402

Provide The One Or More Identified Events As Input To Each Of The Plurality Of Models — 404

Determine The One Or More Identified Events Having A Confidence Level Greater Than A Confidence Threshold — 406

Determine Relationships Between Risk Entities For Each Of The One Or More Determined Events — 408

Determine Relationships Between Different Risk Entities Associated With Different Determined Events — 410

FIG. 4

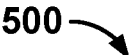
500
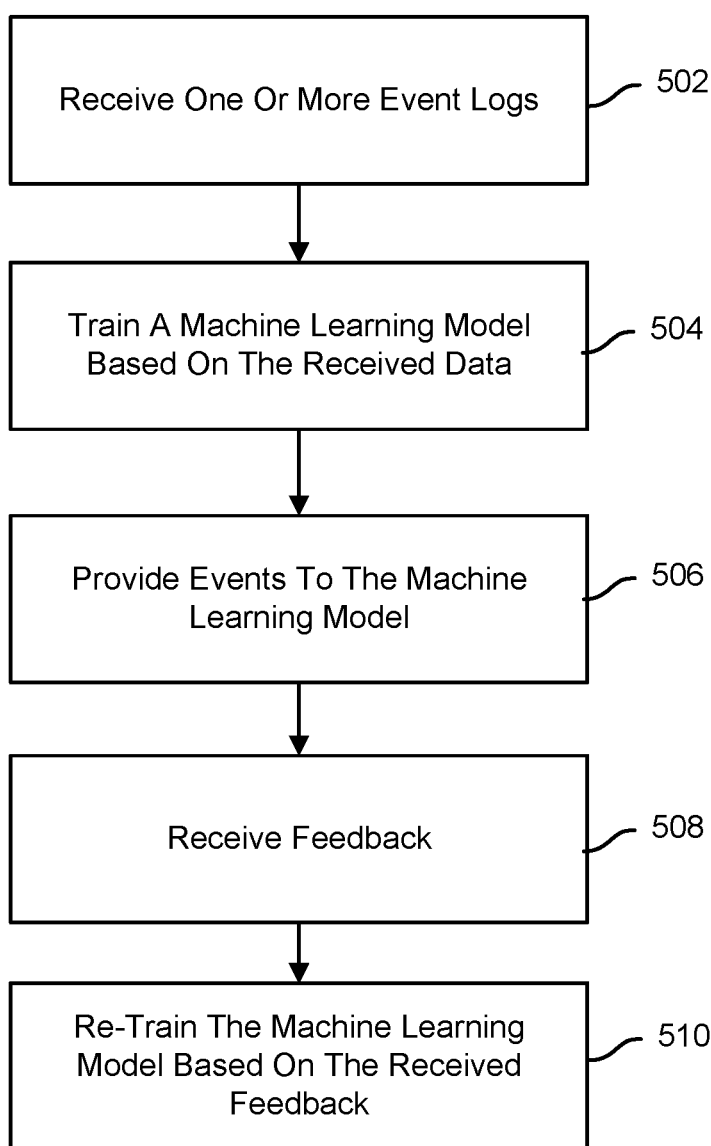
Receive One Or More Event Logs — 502
Train A Machine Learning Model Based On The Received Data — 504
Provide Events To The Machine Learning Model — 506
Receive Feedback — 508
Re-Train The Machine Learning Model Based On The Received Feedback — 510
FIG. 5

600

605

610

615

625 ⟍

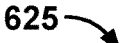

| × Evidence Board | ○ Done |

Case Ransomware Attack     656     ⊞ ▭ Q  ⟨° Share⟩ (Ma)
Status Open | Duration 1 day | Collaborators 1

20     ⊕ ⊖ ↺ ⟨Jan 31, 06:00  Feb 1, 06:00 ⌄⟩

▮▮◻▢◻▮     ▢◻▢▢◻▢
Jan 31, 06                                    Feb 1, 06:00

Share Evidence Board

Cj.1234@gmail.com
_____

Lorem Ipsum is simply dummy text of the printing and typesetting industry.

658 ⟍

Copy link                     Cancel     Create

⇗  ▢ Access Loca
T    ⊕ City San
◻   Country Uni
↗   Time Feb 01 2021 11:15 am        Time  Feb 01 2021 2:23 pm
▤   Ignore                      ⌄      Ignore                      ⌄
↰
↱
↻

| Bad Actor ▐▐▐▐ | | Good Actor ▧▧▧ | | Neutral Actor ☰ |
| ☻  Name  Sen-yun | | ☻  Name  Ji-yoo | | ☻  Na  Unknown |
| Threat Level  High | | Threat Level  Low | | Threat Level  Unknown |
| IP Address  172.33.45.162 | | IP Address  132.147.88.12 | | IP Address  34.71.231.128 |
| Ignore          ⌄ | | Ignore          ⌄ | | Ignore          ⌄ |

| Shield ▧▧▧ | | Shield ▐▐▐▐ |
| ☺  Attacks  Insider Threat | | ☺  Attacks  Ransomware |
|     Events  20 | |     Events  12 |
|     Actions  3 | |     Actions  4 |
| Ignore          ⌄ | | Ignore          ⌄ |

| Data Pool ▨▨▨ | | Data Pool ▨▨▨ | | Data Pool ▐▐▐▐ |
| ⊡  Source  M365 | | ○  Source  M365 | | ⊞  Source  M365 |
| Application  Teams | | Application  OneDrive | | Application  Outlook |
|     Users  23 | |     Users  12 | |     Users  10 |
| Ignore          ⌄ | | Ignore          ⌄ | | Ignore          ⌄ |

640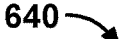

---

| ✕   Evidence Board | ?   Done |
|---|---|

Case Ransomware Attack
Status Open | Duration 1 day | Collaborators 1     ▥ ▯ Q   ⤴ Share (Ma) (Cj)

⊕ ⊖   Jan 31, 06:00–Feb 1, 06:00

20
0   ▯▮▯▯▯▮▯▯▯▯▯▮▯▯▯▯▯▯▮▯▯▯▯▯▮▯▯▯▯▯▮▮▯▯▯▯▯
Jan 31, 06:00

(Ma) (Cj) ⊕

Chats

(Ma) Lorem Ipsum is simply dummy text of the printing and typesetting industry. Lorem Ipsum has been the diam.

Access Location
🌐 City San Francisco, CA
Country United States
    Time Feb 01 2021 11:15 am
Ignore      ⌄

Access Location
🌐 City Pyongyang
Country North Korea
    Time Feb 01 2021 2:23 pm
Ignore      ⌄

Lorem Ipsum is simply dummy text of the printing and typesetting industry. Lorem Ipsum has been the diam. (Cj)

Bad Actor
😎   Name Sen-yun
Threat Level High
IP Address 172.33.45.162
Ignore      ⌄

Good Actor
😊   Name Ji-yoo
Threat Level Low    666
IP Address 132.147.88.12
Ignore      ⌄

Ne
⊕
Thre
Ign (Ma) Lorem Ipsum is simply dummy text of the printing and typesetting industry. Lorem Ipsum has been the diam.

Shield
🛡 Attacks Insider Threat
Events 20
Actions 3
Ignore      ⌄

Shield
🛡 Attacks Ransomware
Events 12
Actions 4
Ignore      ⌄

Lorem Ipsum is simply dummy text of the printing and typesetting industry. Lorem Ipsum has been the diam. (Cj)

(Ma) Lorem Ipsum is simply dummy text of the printing and typesetting industry. Lorem Ipsum has been the diam.

Data Pool
📇 Source M365
Application Teams
Users 23
Ignore      ⌄

Data Pool
☁ Source M365
Application OneDrive
Users 12
Ignore      ⌄

Da
🖳
A
Ign

Lorem Ipsum is simply dummy text of the printing and typesetting industry. Lorem Ipsum has been the diam. (Cj)

100%

Start typing...

650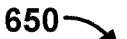

| X  Evidence Board | ? | Done |

Case Ransomware Attack
Status Open | Duration 1 day | Collaborators 1    🔲 💬 🔍 [⌁ Share] (Ma) (Cj)

🔍+ 🔍− ↻ (Jan 31, 06:00 - Feb 1, 06:00 ▾)

20
0  ▯▮▯▯▯▮▯▯▮▯▯▯▯▯▯▮▯▯▯▯▮▯▯▯▯▯▮▯▯▯▯▮▯▯▯▯▮▯▯▯▯▯▮▯▯
Jan 31, 06:00                                             Feb 1, 06:00

672 ⟍ 💬💬 ⟋ 674

Access Location
🌐   City   San Francisco, CA
Country   United States
Time   Feb 01 2021 11:15 am
Ignore                  ▾

Access Location
🌐   City   Pyongyang
Country   North Korea
Time   Feb 01 2021 2:23 pm
Ignore                  ▾

676 ⟍ 💬

Bad Actor
😎   Name   Sen-yun
Threat Level   High
IP Address   172.33.45.162
Ignore                  ▾

Good Actor
😇   Name   Ji-yoo
Threat Level   Low
IP Address   132.147.88.12
Ignore                  ▾

Neutral Actor
😐   Na   Unknown
Threat Level   Unknown
IP Address   34.71.231.128
Ignore                  ▾

Shield
🛡   Attacks   Insider Threat
Events   20
Actions   3
Ignore                  ▾

Shield
🛡   Attacks   Ransomware
Events   12
Actions   4
Ignore                  ▾

Data Pool
🖥   Source   M365
Application   Teams
Users   23
Ignore                  ▾

Data Pool
☁   Source   M365
Application   OneDrive
Users   12
Ignore                  ▾

Data Pool
📧   Source   M365
Application   Outlook
Users   10
Ignore                  ▾

665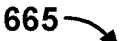

| ✕ Evidence Board | ? Done |

Case Ransomware Attack
Status Open | Duration 1 day | Collaborators 1     ▥ ▭ Q  ⟨ Share  (Ma) (Cj)

⊕ ⊖ ↻ (Jan 31, 06:00 - Feb 1, 06:00 ▾)

20
0  ▯▮▫▫▫▪▯▯▮▫▫▫▫▯▯▯▯▯▪▫▫▫▯▯▯▯▫▫▫▫▯▯▯▯▫▫▫▫▯▯▮▫▫▫▯▯▯▯▫▫▪▫▫▯▯▯▯▫▫▫▫▯
Jan 31, 06:00                                                              Feb 1, 06:00

▬▬ ▬▬

Access Location
🌐  City  San Francisco, CA
Country  United States
     Time  Feb 01 2021 11:15 am
Ignore                              ▾

Access Location
🌐  City  Pyongyang
Country  North Korea
     Time  Feb 01 2021 2:23 pm
Ignore                              ▾

⌐607                                                         ⌐608

Bad Actor
😎     Name  Sen-yun
Threat Level  High
IP Address  172.33.45.162
Ignore                              ▾

Good Actor
😇     Name  Ji-yoo
Threat Level  Low
IP Address  132.147.88.12
[Ignored] ⌐682                      ▾

Neutral Actor
😐     Na  Unknown
Threat Level  Unknown
IP Address  34.71.231.128
[Ignored]                           ▾

684

612⌐

Shield
🛡     Attacks  Insider Threat
     Events  20
     Actions  3
[Ignored]                           ▾

Shield
🛡     Attacks  Ransomware
     Events  12
     Actions  4
Ignore                              ▾

686⌐

Data Pool
🗂     Source  M365
Application  Teams
     Users  23
Ignore                              ▾

Data Pool
☁     Source  M365
Application  OneDrive
     Users  12
[Ignored]                           ▾

Data Pool
📧     Source  M365
Application  Outlook
     Users  10
Ignore                              ▾

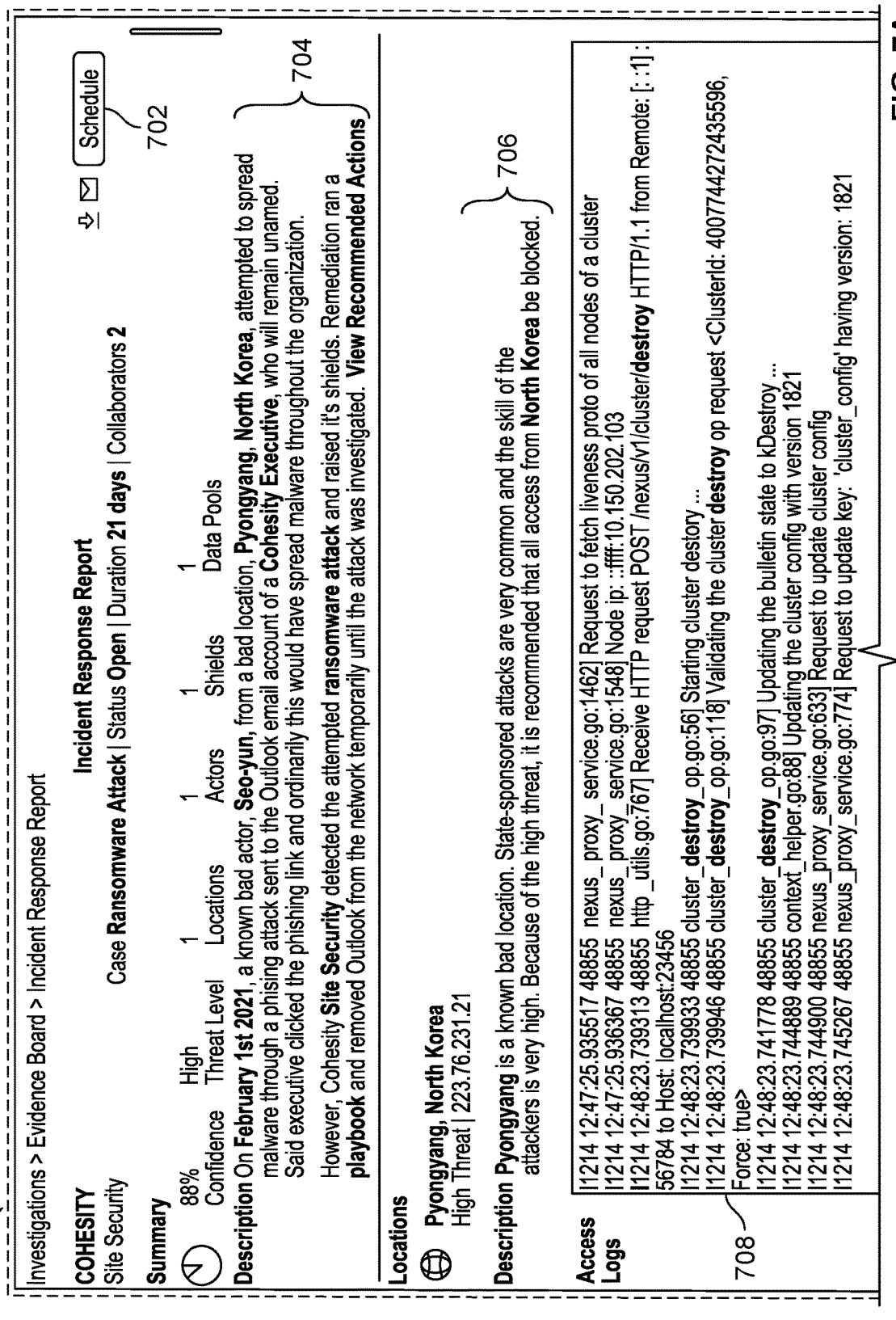

700

Investigations > Evidence Board > Incident Response Report

COHESITY
Site Security

Incident Response Report

Case Ransomware Attack | Status Open | Duration 21 days | Collaborators 2

702

⇧ ☑ Schedule

Summary

⊘ 88%
Confidence

High
Threat Level

1
Locations

1
Actors

1
Shields

1
Data Pools

Description On February 1st 2021, a known bad actor, Seo-yun, from a bad location, Pyongyang, North Korea, attempted to spread malware through a phising attack sent to the Outlook email account of a Cohesity Executive, who will remain unamed. Said executive clicked the phishing link and ordinarily this would have spread malware throughout the organization.

However, Cohesity Site Security detected the attempted ransomware attack and raised it's shields. Remediation ran a playbook and removed Outlook from the network temporarily until the attack was investigated. View Recommended Actions

704

Locations

⊕ Pyongyang, North Korea
High Threat | 223.76.231.21

Description Pyongyang is a known bad location. State-sponsored attacks are very common and the skill of the attackers is very high. Because of the high threat, it is recommended that all access from North Korea be blocked.

706

Access Logs

[1214 12:47:25.935517 48855 nexus_proxy_service.go:1462] Request to fetch liveness proto of all nodes of a cluster
[1214 12:47:25.936367 48855 nexus_proxy_service.go:1548] Node ip: ::ffff:10.150.202.103
[1214 12:48:23.739313 48855 http_utils.go:767] Receive HTTP request POST /nexus/v1/cluster/destroy HTTP/1.1 from Remote: [::1] :
56784 to Host: localhost:23456
[1214 12:48:23.739933 48855 cluster_destroy_op.go:56] Starting cluster destory ...
[1214 12:48:23.739946 48855 cluster_destroy_op.go:118] Validating the cluster destroy op request <ClusterId: 4007744272435596,
Force: true>
[1214 12:48:23.741778 48855 cluster_destroy_op.go:97] Updating the bulletin state to kDestroy ...
[1214 12:48:23.744889 48855 context_helper.go:88] Updating the cluster config with version 1821
[1214 12:48:23.744900 48855 nexus_proxy_service.go:633] Request to update cluster config
[1214 12:48:23.745267 48855 nexus_proxy_service.go:774] Request to update key: 'cluster_config' having version: 1821

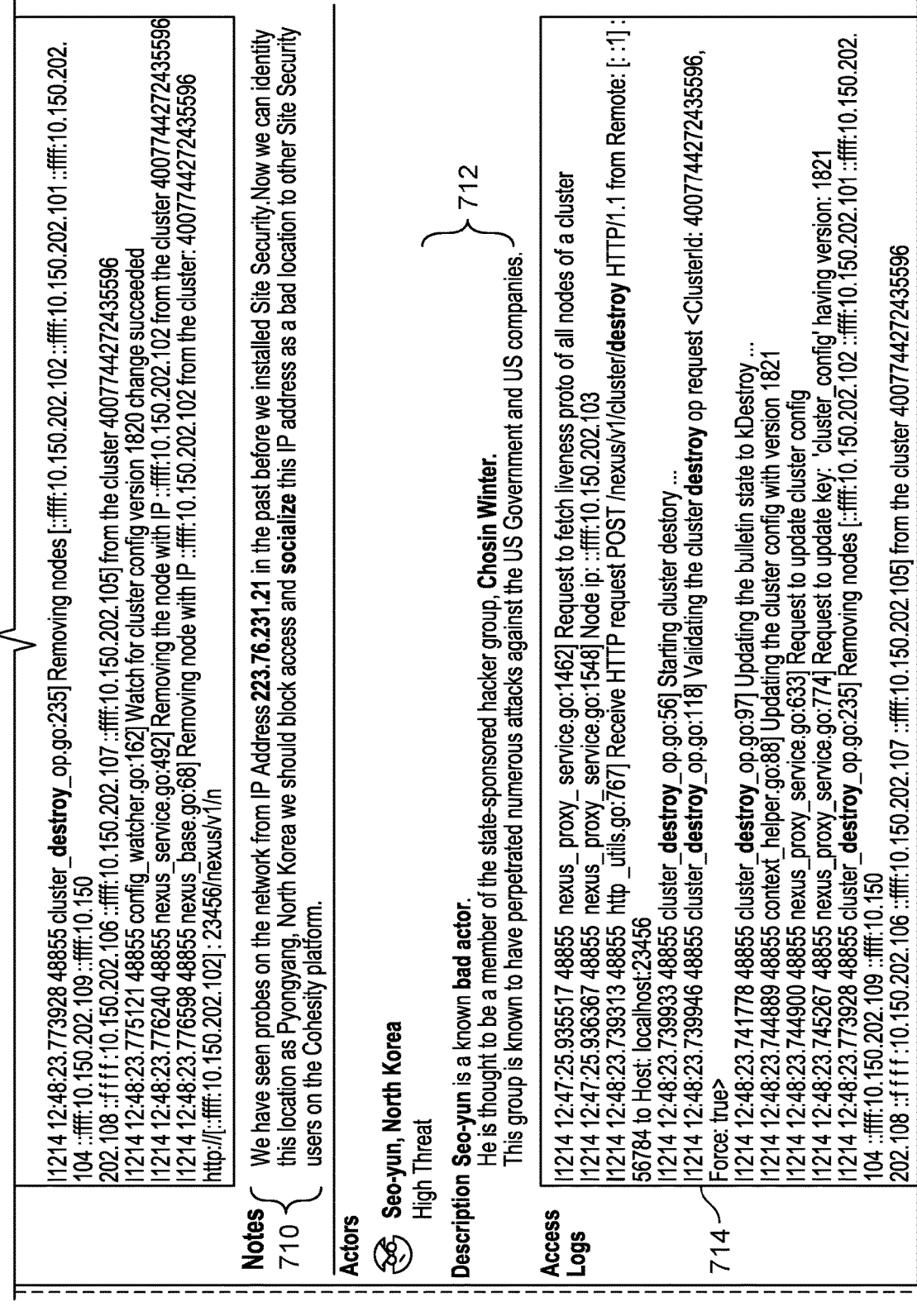

Notes
710

]1214 12:48:23.773928 48855 cluster _destroy_op.go:235] Removing nodes [::ffff:10.150.202.102 ::ffff:10.150.202.101 ::ffff:10.150.202.104 ::ffff:10.150.202.109 ::ffff:10.150 202.108 ::f f f:10.150.202.106 ::ffff:10.150.202.107 ::ffff:10.150.202.105] from the cluster 4007744272435596
]1214 12:48:23.775121 48855 config_watcher.go:162] Watch for cluster config version 1820 change succeeded
]1214 12:48:23.776240 48855 nexus_service.go:492] Removing the node with IP ::ffff:10.150.202.102 from the cluster 4007744272435596
]1214 12:48:23.776598 48855 nexus_base.go:68] Removing node with IP ::ffff:10.150.202.102 from the cluster: 4007744272435596
http://[::ffff:10.150.202.102] : 23456/nexus/v1/n We have seen probes on the network from IP Address 223.76.231.21 in the past before we installed Site Security.Now we can identify this location as Pyongyang, North Korea we should block access and socialize this IP address as a bad location to other Site Security users on the Cohesity platform.

Actors

Seo-yun, North Korea
High Threat

Description Seo-yun is a known bad actor.
He is thought to be a member of the state-sponsored hacker group, Chosin Winter.
This group is known to have perpetrated numerous attacks against the US Government and US companies.

712

Access Logs
714

]1214 12:47:25.935517 48855 nexus_proxy_ service.go:1462] Request to fetch liveness proto of all nodes of a cluster
]1214 12:47:25.936367 48855 nexus_proxy_ service.go:1548] Node ip: ::ffff:10.150.202.103
]1214 12:48:23.739313 48855 http_utils.go:767] Receive HTTP request POST /nexus/v1/cluster/destroy HTTP/1.1 from Remote: [::1] : 56784 to Host: localhost:23456
]1214 12:48:23.739933 48855 cluster_destroy_op.go:56] Starting cluster destory ...
]1214 12:48:23.739946 48855 cluster_destroy_op.go:118] Validating the cluster destroy op request <ClusterId: 4007744272435596, Force: true>
]1214 12:48:23.741778 48855 cluster_destroy_op.go:97] Updating the bulletin state to kDestroy ...
]1214 12:48:23.744889 48855 context_helper.go:88] Updating the cluster config with version 1821
]1214 12:48:23.744900 48855 nexus_proxy_service.go:633] Request to update cluster config
]1214 12:48:23.745267 48855 nexus_proxy_service.go:774] Request to update key: 'cluster_config' having version: 1821
]1214 12:48:23.773928 48855 cluster_destroy_op.go:235] Removing nodes [::ffff:10.150.202.102 ::ffff:10.150.202.101 ::ffff:10.150.202.104 ::ffff:10.150.202.109 ::ffff:10.150.202.108 ::f f f:10.150.202.106 ::ffff:10.150.202.107 ::ffff:10.150.202.105] from the cluster 4007744272435596

FIG. 7A (Cont.)

PROVIDING A GRAPHICAL REPRESENTATION OF ANOMALOUS EVENTS

CROSS REFERENCE TO OTHER APPLICATIONS

This application is a continuation of U.S. patent application Ser. No. 17/501,617 entitled PROVIDING A GRAPHICAL REPRESENTATION OF ANOMALOUS EVENTS filed Oct. 14, 2021 which is incorporated herein by reference for all purposes.

BACKGROUND OF THE INVENTION

A primary system maintains an event log that stores a plurality of entries for a plurality of events. The event log may be updated when an object (e.g., file or directory) is accessed, modified, deleted, or created. The event log may also be updated for other events associated with the primary system, such as when a user logged in, the number of failed login attempts associated with a client device, each time a software update was performed, each time a password was changed, etc. A user may desire to determine whether there has been any anomalous activity at the primary system. However, the number of events stored in the event log may be too voluminous to determine whether there has been any anomalous activity in a timely manner.

BRIEF DESCRIPTION OF THE DRAWINGS

Various embodiments of the invention are disclosed in the following detailed description and the accompanying drawings.

FIG. 2 is a flow diagram illustrating a process for providing evidence of anomalous behavior in accordance with some embodiments.

FIG. 3 is a flow diagram illustrating a process for analyzing an event log in accordance with some embodiments.

FIG. 4 is a flow diagram illustrating a process for analyzing an event log in accordance with some embodiments.

FIG. 5 is a flow diagram illustrating a process of training a model in accordance with some embodiments.

FIG. 7A is an example of a graphical user interface in accordance with some embodiments.

DETAILED DESCRIPTION

Figure 1:
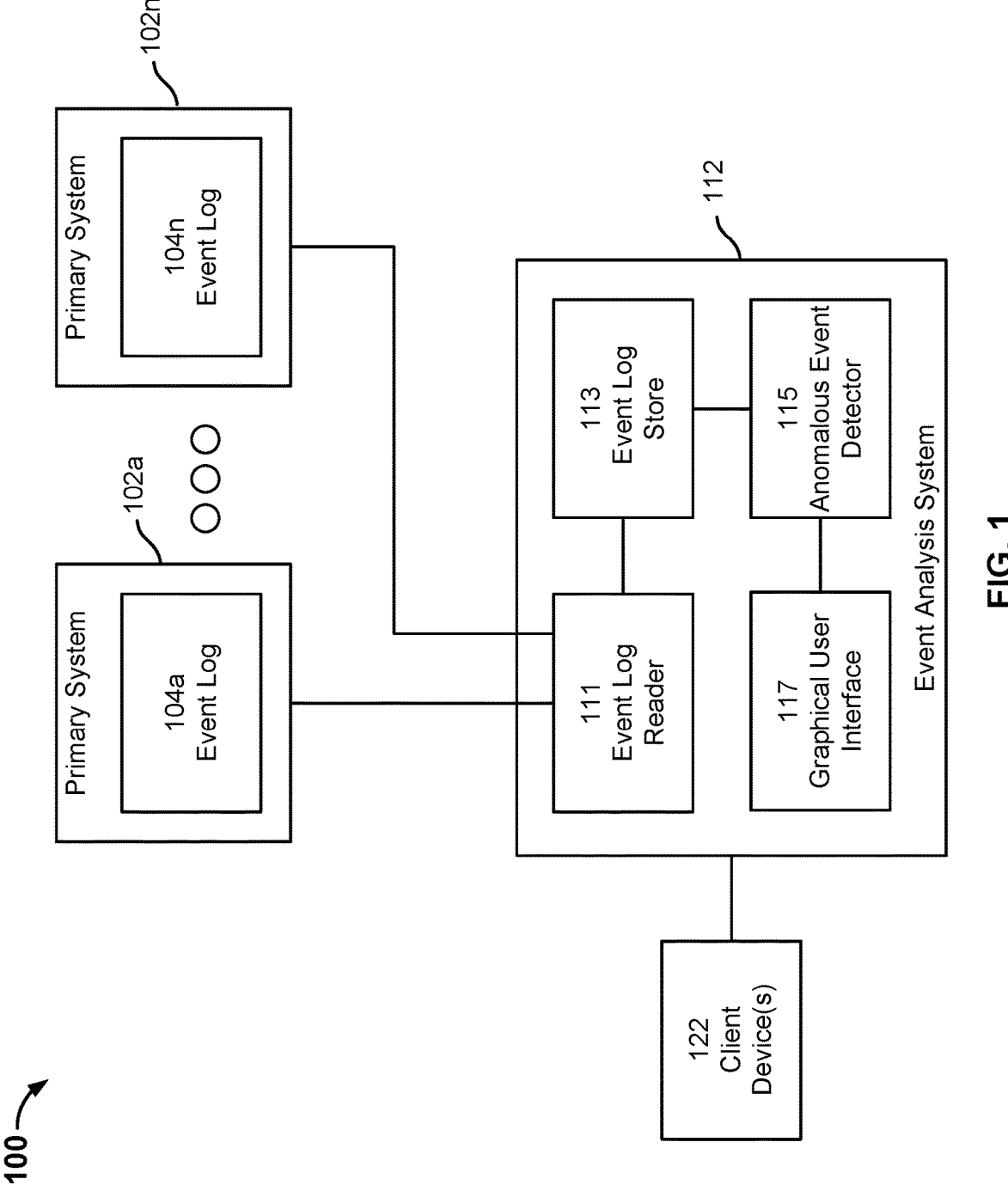
FIG. 1 is a block diagram illustrating a system for providing a graphical representation of anomalous events in accordance with some embodiments.

Techniques to provide a graphical representation of anomalous events are described herein. One or more event logs are received and stored at an event analysis system. The one or more event logs include a plurality of entries. Each entry corresponds to an event. An entry may identify an event type and one or more attributes associated with the event. Examples of event type include a file deletion, a file access, a file creation, a file move, a directory deletion, a directory creation, a directory move, a system login grant, a system login denial, a user being added, a user being deleted, a file being downloaded, a user password change, change of state, change of status, etc. Examples of event attributes include a timestamp, a sequence number, a user (actor) to which the event is associated, an object with which the event is associated, an internet protocol address, a location from which the event occurred, etc. Examples of objects include files, databases, virtual machines, applications, containers, volumes, etc.

The one or more event logs are analyzed by providing each entry as input to a plurality of models that are configured to detect different types of anomalous behavior. For example, a model may be configured to determine whether an event or a group of events are indicative of an insider attack, a ransomware attack, a brute force attack, wide access (e.g., log in attempts from different locations), a sensitive data leak, a geo fencing breach, or a combination thereof. In some embodiments, the output of one or more models is input to a model (e.g., a layered model).

Based on the one or more event log entries, each of the models is configured to output a corresponding confidence level that indicates whether the one or more events corresponding to the one or more event log entries are anomalous. An event by itself or a combination of events may be indicative of anomalous behavior. A model may determine that an event is anomalous in the event a confidence level associated with the event is greater than a confidence level threshold. In some embodiments, the confidence level is based on historical events associated with a particular user. In some embodiments, the confidence level is based on historical events associated with a system that provided the event log. In some embodiments, the confidence level is based on historical programmatically generated events associated with an application. In some embodiments, the confidence level is based on a combination of events (e.g., the confidence level(s) associated with one or more other events may influence the confidence level of an event, a normal event may be determined to be an anomalous event if the event is a threshold event within a time frame. The threshold event is determined to be an anomalous event. The other events may or may not be determined to be anomalous events).

Each event is associated with at least one risk entity, such as location, actor, model that determined the event to be anomalous, an object that the actor accessed or attempted to access, etc. The relationship between the risk entities associated with an event are determined. The relationship between different risk entities associated with different events are determined. For example, the event analysis system determines whether any of the events share risk entities.

In some embodiments, the one or more event logs are provided to a third party system that is configured to analyze the one or more event logs for one or more anomalous events. The third party system may provide the analysis to the event analysis system. A graphical representation of risk entities associated with one or more detected anomalous events may be generated based on the received analysis.

A graphical representation of risk entities associated with one or more detected anomalous events is provided to a client device. This enables a user associated with the client device to determine potential risk to a system without having to analyze each specific event log. The graphical representation is a visual representation of automatically detected relationships between the risk entities. The graphical representation is comprised of a first plurality of graphical user interface items corresponding to the risk entities associated with at least one of the one or more detected anomalous events.

For example, a first graphical user interface item corresponding to a location associated with a first event may be linked to a second graphical user interface item corresponding to an actor associated with the first event, which is linked to a third graphical user interface item corresponding to a model that determined the first event to be anomalous, which is linked to a fourth graphical user interface item corresponding an object that the actor associated with the first event accessed or attempted to access. In some embodiments, the relationship is depicted for anomalous events that occurred during a particular time frame. In some embodiments, the relationship is depicted for all events that occurred during the particular time frame. The particular time frame may be specified via the client device.

The event analysis system receives a selection of a graphical user interface item corresponding to one of the risk entities. The one or more event logs are re-analyzed based on the selected graphical user interface item to identify, if any, one or more other events related to the selected graphical user interface item. This analysis may enable a user associated with a client system to determine whether an event associated with the selected graphical user interface item is an isolated event or part of a group of events that are indicative of anomalous behavior. The one or more event logs may include additional event log(s) that were received since the previous analysis. In some embodiments, the event analysis system re-analyzes the one or more event logs for one or more other events that occurred in the same time frame as the first plurality of graphical user interface items. In some embodiments, the event analysis system analyzes the one or more event logs for one or more other events that occurred outside the time frame associated with the first plurality of graphical user interface items. In some embodiments, the event analysis system re-analyzes the one or more event logs for one or more other events that occurred in the same time frame as the first plurality of graphical user interface items and analyzes the one or more event logs for one or more other events that occurred outside the time frame associated with the first plurality of graphical user interface items.

The event log entries associated with the one or more identified events are provided as input to each of the plurality of models. Based on the one or more event log entries, each of the models is configured to output a confidence level that indicates whether an identified event is anomalous. An identified event is determined to be anomalous in the event its corresponding confidence level is greater than a confidence level threshold. In some embodiments, a group of events is determined to be anomalous (e.g., an anomalous incident) in the event a model outputs a confidence level that is greater than a confidence level threshold for the group of events. For example, the model may count the number of times that a particular type of event occurs within a particular period of time. The model may determine that a group of events of a particular type is anomalous after the number of occurrences of the particular type of event is greater than an event threshold. The events included in the group may be from the same event log and/or one or more other event logs.

Each anomalous event is associated with at least one of risk entity, such as location, actor, model that determined the event to be anomalous, an object that the actor accessed or attempted to access, etc. The relationships between the risk entities associated with the anomalous event are determined. The relationships between different entities associated with different anomalous events are determined. For example, the event analysis system determines whether any of the anomalous events share risk entities.

The graphical representation of risk entities associated with one or more detected anomalous events is updated. The updated graphical representation is comprised of a second plurality of graphical user interface items. Similar to the first plurality of graphical user items, a graphical user interface item may correspond to a risk entity, such as a location, an actor, a model that determined an event to be anomalous, or an object that the actor accessed or attempted to access. The graphical representation may include indications of a measure of anomaly for an event that are based on a confidence level outputted by one of the models. The measure of anomaly is for the particular period of time associated with the second plurality of graphical user interface items. The measure of anomaly for an event is reflected in risk entities associated with the event. The reflected measure of anomaly may be color-coded. This indicates the seriousness of detected event. The graphical representation depicts the relationship between the risk entity corresponding to the selected graphical user interface item and the plurality of risk entities associated with one or more anomalous events.

FIG. 1 is a block diagram illustrating a system for providing a graphical representation of anomalous events in accordance with some embodiments. In the example shown, system 100 includes primary systems 102a . . . 102n, event analysis system 112, and one or more client devices 122.

Primary systems 102a . . . 102n may be a server, a virtual machine running on a computing device, a database running on a computing device, or any computing device that is capable of generating an event log. Although FIG. 1 depicts two primary systems, system 100 may include 1:n primary systems. In some embodiments, primary systems 102a . . . 102n are associated with a single tenant. A tenant may correspond to a user, an enterprise, a government, a company, an organization, etc. In some embodiments, primary systems 102a . . . 102n are associated with a plurality of different tenants. In some embodiments, event analysis system 112 is coupled to a plurality of different tenants, each tenant being associated with one or more corresponding primary systems.

Primary systems 102a . . . 102n include one or more corresponding event logs 104a . . . 104n that are each comprised of a plurality of entries. An event log may be generated by an application (e.g., collaboration application, productivity application, database application, etc.) hosted by the primary system. In some embodiments, an event log is generated by an operating system, firmware, a firewall, etc. Each entry of an event log identifies an event type and one or more attributes associated with the event. Examples of event type include a file deletion, a file access, a file creation, a file move, a directory deletion, a directory creation, a directory move, a system login grant, a system login denial, a user being added, a user being deleted, a file being downloaded, a user password change, etc. Examples of event attributes include a timestamp, a sequence number, a user to which the event is associated, an object with which the event is associated, an internet protocol address, a location from which the event occurred, etc. An object may be included in a data pool. A data pool is a description of one or more objects to be included in the data pool when one or more data management services (e.g., backup, restore, migration, replication, tiering, disaster recovery, etc.) are performed.

Event analysis system 112 is coupled to primary systems 102a . . . 102n. Event analysis system 112 may be a server, a computing cluster comprised of a plurality of computing nodes, a virtual machine running on a computing device (e.g., a computer), a containerized application running on one or more computing devices, a cloud computing device, etc.

Event analysis system 112 includes event log reader 111. In some embodiments, event log reader 111 sends a corresponding request to primary systems 102a . . . 102n for an event log. In response, the primary systems 102a . . . 102n provide the requested event log. In some embodiments, primary system 102a . . . 102n sends (continually or periodically) a corresponding set of one or more events included in a corresponding event log 104a . . . 104n to event log reader 111. In some embodiments, event log reader 111 remotely accesses an event log stored on primary systems 102a . . . 102n.

Event log reader 111 stores the obtained event logs in event log store 113. Event log store 113 may be stored in a memory or a storage device associated with event analysist system 112. Event log store 113 is coupled to anomalous event detector 115. Anomalous event detector 115 is comprised of a plurality of models. Anomalous event detector 115 obtains the one or more entries corresponding to one or more events included in the event logs as input to the plurality of models.

The plurality of models may be configured to perform analysis according to a schedule (e.g., daily). In some embodiments, a first sub-set of the models is configured to perform analysis according to a first schedule (e.g., daily) and a second sub-set of the models is configured to perform analysis according to a second schedule (e.g., weekly). Each of the models is configured to determine whether an event is anomalous. The anomalous event by itself or a group of events may be indicative of anomalous behavior. A model may be configured to analyze event log entries that correspond to events that occurred since a last time the model analyzed event log entries. In some embodiments, a model is streamed log entries and analyzes the log entries as they are received. In some embodiments, event analysis system 112 provides to external device 122 a notification of an anomalous event being detected. In response, event analysis system 112 may receive from external device 122 an indication of a time frame in which one or more models analyzes event log events for anomalous events.

The plurality of models are configured to detect different types of anomalous behavior. For example, a model may be configured to determine whether an event or a group of events are indicative of an insider attack, a ransomware attack, a brute force attack, wide access (e.g., log in attempts from different locations), a sensitive data leak, a geo fencing breach, or a combination thereof. A model is configured to detect specific types of anomalous events. For example, a first model configured to detect insider attack events may determine that a first event is indicative of an insider attack and a second model configured to detect ransomware events may determine that a second event is indicative of a ransomware attack. The second model may determine that the first event is not indicative of a ransomware attack.

A model may be a rules-based model, a machine learning model, a deterministic-based model, a heuristic-based model, etc. Based on the one or more event log entries obtained from event log store 113, each of the models is configured to output a corresponding confidence level that indicates whether one or more events corresponding to the one or more event log entries are anomalous. A model may determine that an event is an anomalous event in the event a confidence level outputted by the model is greater than a confidence level threshold. In some embodiments, the confidence level is based on historical events associated with a particular user. In some embodiments, the confidence level is based on historical events associated with a system that provided the event log. In some embodiments, the confidence level is based on historical programmatic events associated with an application. In some embodiments, the confidence level is based on a combination of events.

In some embodiments, none of the plurality of models output determine any of the events to be anomalous. In some embodiments, one of the plurality of models outputs a corresponding confidence level that indicates one or more events are anomalous. In some embodiments, at least two of the plurality of models output a corresponding confidence level that indicates one or more events are anomalous.

After the plurality of models have executed, event analysis system 112 is configured to generate a graphical representation of risk entities associated with at least one of the one or more anomalous events. Examples of risk entities include a location, an actor, a model associated with the event, or an object that the actor accessed or attempted to access. The graphical representation is comprised of a first plurality of graphical user interface items corresponding to the risk entities associated with at least one of the one or more anomalous events. The graphical representation is a visual representation of automatically detected relationships between the risk entities. For example, a first graphical user interface item corresponding to a location may be linked to a second graphical user interface item corresponding to an actor, which is linked to a third graphical user interface item corresponding to a model associated with the anomalous event, which is linked to an object that the actor accessed or attempted to access. In some embodiments, the relationship is depicted for an event or a group of events that occurred during the particular time frame and having a confidence level greater than a confidence level threshold. In some embodiments, the relationship is depicted for all events or a group of events that occurred during the particular time frame.

The graphical representation may include indications of a measure of anomaly for an event, which may be based on a confidence level outputted by one of the models. The measure of anomaly for an event is reflected in risk entities associated with the event. The reflected measure of anomaly may be color-coded. For example, a graphical user interface item corresponding to an entity associated with a high-risk event may be in red, a graphical user interface item corresponding to an entity associated with a medium-risk event may be in orange, and a graphical user interface item corresponding to an entity associated with a low-risk event may be in green.

The measure of anomaly for an event may be based on a confidence level outputted by one of the models. The measure of anomaly for an event is reflected in risk entities associated with the event. A risk entity may be associated with a high risk event in the event a confidence level of an event associated with the risk entity is greater than a first risk threshold. A risk entity may be associated with a medium risk event in the event a confidence level of an event associated with the risk entity is less than or equal to the first risk threshold and greater than a second risk threshold. A risk entity may be associated with a low risk event in the event a confidence level of an event associated with the risk entity is less than or equal to the second risk threshold and greater than a risk lower limit. An event is determined to be anomalous in the event the confidence level is at least greater than the risk lower limit.

Event analysis system 112 is configured to provide the graphical representation to one or more client devices 122 via graphical user interface 117. A client device may be a computer, a desktop, a laptop, a tablet, a server, a smart device, etc. Event analysis system 112 is configured to receive one or more inputs from the one or more client devices 122 via graphical user interface 117. In some embodiments, an input causes the graphical representation to be shared with another user. Once shared, the other user may collaborate on the graphical representation via graphical user interface 117. In some embodiments, an input enables a chat window to be associated with graphical user interface 117. In some embodiments, an input enables a comment to be associated with a graphical user interface item. In some embodiments, an input enables a graphical user interface item to be ignored. In some embodiments, an input causes a report of the detected anomalous behavior to be generated.

In some embodiments, an input selects one or more of the graphical user interface items. In response to the selection of the graphical user interface item(s), anomalous event detector 115 is configured to determine one or more events associated with the selected graphical user interface item(s) that may be indicative of anomalous behavior. Anomalous event detector 115 is configured to re-analyze the one or more event logs stored in event log store 113 to identify one or more events associated with the selected graphical user interface item(s).

For example, a graphical user interface item corresponding to a location may be selected. In response to the selection, anomalous event detector 115 re-analyzes one or more event logs stored in event log store 113 to identify, if any, one or more other events associated with the location.

In another example, a graphical user interface item corresponding to an actor may be selected. In response to the selection, anomalous event detector 115 re-analyzes one or more event logs stored in event log store 113 to identify, if any, one or more other events associated with the actor.

In another example, a graphical user interface item corresponding to a model may be selected. In response to the selection, anomalous event detector 115 re-analyzes one or more event logs stored in event log store 113 to identify, if any, one or more other events associated with the model.

In another example, a graphical user interface item corresponding to an object that the actor accessed or attempted to access may be selected. In response to the selection, anomalous event detector 115 re-analyzes one or more event logs stored in event log store 113 to identify, if any, one or more other events associated with object corresponding to the selected graphical user interface item.

In some embodiments, anomalous event detector 115 re-analyzes one or more event logs stored in event log store 113 for one or more events that occurred in the same time frame as the first plurality of graphical user interface items. In some embodiments, anomalous event detector 115 analyzes event queue 113 for one or more events that occurred outside the time frame associated with the first plurality of graphical user interface items. In some embodiments, anomalous event detector 115 re-analyzes event queue 113 for one or more events that occurred in the same time frame as the first plurality of graphical user interface items and for one or more events that occurred outside the time frame associated with the first plurality of graphical user interface items.

An individual identified event or a combination of identified events are provided as input to the plurality of models associated with anomalous event detector 115. Each of the models is configured to output a confidence level that indicates whether an identified event or a combination of identified events are indicative of anomalous behavior. After the plurality of models have executed, event analysis system 112 is configured to update the graphical user interface 117. In some embodiments, graphical user interface 117 is updated to provide a visual representation of a relationship between the selected graphical user interface item and risk entities associated with all of the identified events. In some embodiments, graphical user interface 117 is updated to provide a visual representation of a relationship between the selected graphical user interface item and risk entities associated with identified events having a confidence level that is greater than the confidence threshold. In some embodiments, the graphical representation provides a visual representation of detected relationships of risk entities that were not discovered in the initial analysis.

The graphical representation is comprised of a second plurality of graphical user interface items. A graphical user interface item may correspond to a risk entity, such as a location, an actor, a model that determined the event to be anomalous, or an object that the actor accessed or attempted to access. The graphical representation may include indications of a measure of anomaly associated with a plurality of events. The measures of anomaly associated with the events are reflected in the risk entities associated with the events. The reflected measure of anomaly may be color-coded. The graphical representation depicts the relationship between the entity corresponding to the selected graphical user interface item and the plurality of entities associated with one or more identified events or an identified group of events that occurred during a specified time frame.

For example, in the event a graphical user interface item corresponding to a location was selected, for each identified event, the graphical representation may be updated to depict the relationship between the location associated with the selected graphical user interface item, an actor associated with an identified event, a model associated with the identified event, and an object that the actor associated with the identified event accessed or attempted to access.

In another example, in the event a graphical user interface item corresponding to an actor was selected, for each identified event, the graphical representation may be updated to depict the relationship between the actor associated with the selected graphical user interface item, a location associated with an identified event, a model associated with the identified event, and an object that the actor associated with the identified event accessed or attempted to access.

In another example, in the event a graphical user interface item corresponding to a model was selected, for each identified event, the graphical representation may be updated to depict the relationship between the model associated with the selected graphical user interface item, a location associated with an identified event, an actor associated with the identified event, and an object that the actor associated with the identified event accessed or attempted to access.

In another example, in the event a graphical user interface item corresponding to an object that an actor accessed or attempted to access was selected, for each identified event, the graphical representation may be updated to depict the relationship between the object associated with the selected graphical user interface item, a location associated with an identified event, an actor associated with the identified event, and a model associated with the identified event.

FIG. 2 is a flow diagram illustrating a process for providing evidence of anomalous behavior in accordance with some embodiments. In the example shown, process 200 may be implemented by an event analysis system, such as event analysis system 112.

At 202, one or more event logs are obtained. The one or more event logs include a plurality of entries. Each entry corresponds to an event. An entry may identify an event type and one or more attributes associated with the event. Examples of event type include a file deletion, a file access, a file creation, a file move, a directory deletion, a directory creation, a directory move, a system login grant, a system login denial, a user being added, a user being deleted, a file being downloaded, a user password change, etc. Examples of event attributes include a timestamp, a sequence number, a user to which the event is associated, an object with which the event is associated, an internet protocol address, a location from which the event occurred, etc.

In some embodiments, an event analysis system remotely accesses an event log stored on a source system.

At 204, the one or more event logs are stored.

At 206, the one or more event logs are analyzed. An event analysis system includes a plurality of models that are configured to detect different types of anomalous behavior. For example, a model may be configured to determine whether an event or a group of events are indicative of an insider attack, a ransomware attack, a brute force attack, wide access (e.g., log in attempts from different locations), a sensitive data leak, a geo fencing breach, or a combination thereof. The entries of the one or more event logs are provided as input to each of the plurality of models.

A model may be a rules-based model, a machine learning model, a deterministic-based model, a heuristic-based model, etc. Based on the one or more event log entries, each of the models is configured to output a corresponding confidence level that indicates whether the one or more events corresponding to the one or more log entries are anomalous. A model may determine that an event is anomalous in the event a confidence level associated with the event is greater than a confidence level threshold. In some embodiments, the confidence level is based on historical events associated with a particular user. In some embodiments, the confidence level is based on historical events associated with a system that provided the event log.

Each event is associated with at least one risk entity, such as location, actor, model that determined the event to be indicative of anomalous behavior, an object that the actor accessed or attempted to access, etc. The relationship between the risk entities associated with an event may be determined in part from an event log entry associated with the event. The relationship between different risk entities associated with different events are determined. For example, the event analysis system determines whether any of the events share risk entities.

At 208, a graphical representation of risk entities associated with one or more detected anomalous events is provided. The graphical representation may be provided for one or more events having a corresponding confidence level greater than a confidence threshold. The graphical representation is comprised of a first plurality of graphical user interface items corresponding to the risk entities associated with at least one of the one or more detected anomalous events.

The graphical representation is a visual representation of automatically detected relationships between the risk entities. For example, a first graphical user interface item corresponding to a location may be linked to a second graphical user interface item corresponding to an actor, which is linked to a third graphical user interface item corresponding to a model that determined the event to be anomalous, which is linked to an object that the actor accessed or attempted to access. In some embodiments, the relationship is depicted for anomalous events that occurred during a particular time frame. In some embodiments, the relationship is depicted for all events that occurred during the particular time frame. The particular time frame may be specified by the client device.

At 210, a selection of a graphical user interface item corresponding to one of the risk entities is received.

At 212, the one or more event logs are re-analyzed based on the selected graphical user interface item. The one or more event logs may include one or more other events associated with the selected user interface item. The one or more event logs may include additional event log(s) that were received since the previous analysis. The event analysis system re-analyzes the one or more event logs to identify the one or more other events, if any, associated with the selected user interface item.

In some embodiments, the event analysis system re-analyzes the one or more event logs for one or more events occurring in the same time frame as the first plurality of graphical user interface items. In some embodiments, the event analysis system re-analyzes the one or more event logs for one or more events that occurred outside the time frame associated with the first plurality of graphical user interface items. In some embodiments, the event analysis system re-analyzes the one or more event logs for one or more events that occurred in the same time frame as the first plurality of graphical user interface items and analyzes the one or more event logs for one or more events that occurred outside the time frame associated with the first plurality of graphical user interface items.

A graphical user interface item corresponding to a location may be selected. In response to the selection, the event analysis system re-analyzes one or more event logs to identify, if any, one or more other events associated with the location. At least one of the one or more identified events associated with the location may have a corresponding confidence level outputted by one or more of the models that is greater than the confidence level threshold.

In another example, a graphical user interface item corresponding to an actor may be selected. In response to the selection, the event analysis system re-analyzes one or more event logs to identify, if any, one or more other events associated with the actor. At least one of the one or more identified events associated with the actor may have a corresponding confidence level outputted by one or more of the models that is greater than the confidence level threshold.

In another example, a graphical user interface item corresponding to a model may be selected. In response to the selection, the event analysis system re-analyzes one or more event logs stored to identify, if any, one or more other events associated with the model. At least one of the one or more identified events associated with the model may have a corresponding confidence level outputted by the model corresponding to the selected graphical user interface item that is greater than the confidence level threshold.

In another example, a graphical user interface item corresponding to an object that the actor accessed or attempted to access may be selected. In response to the selection, the event analysis system re-analyzes one or more event logs to identify, if any, one or more other events associated with object corresponding to the selected graphical user interface item. At least one of the one or more identified events associated with the object corresponding to the selected graphical user interface item may have a corresponding confidence level outputted by one or more of the models that is greater than the confidence level threshold.

At 214, the graphical representation of risk entities associated with one or more detected anomalous events is updated. The graphical representation is comprised of a second plurality of graphical user interface items. A graphical user interface item may correspond to a risk entity, such as a location, an actor, a model that detected anomalous event associated with the event or group of events, or an object that the actor accessed or attempted to access. The graphical representation may include indications of a measure of anomaly associated with the events. The measure of anomaly is reflected in risk entities associated with the event, which may be color-coded. The graphical representation depicts the relationship between the entity corresponding to the selected graphical user interface item and the plurality of entities associated with one or more identified events. The relationship may be depicted for all of the one or more identified events. In some embodiments, the relationship is depicted for one or more identified events having a corresponding confidence level greater than a confidence threshold level.

For example, in the event a graphical user interface item corresponding to a location was selected at 210, for each identified event, the graphical representation may be updated to depict the relationship between the location associated with the selected graphical user interface item, an actor associated with an identified event, a model associated with the identified event, and an object that the actor associated with the identified event accessed or attempted to access.

In another example, in the event a graphical user interface item corresponding to an actor was selected at 210, for each identified event, the graphical representation may be updated to depict the relationship between the actor associated with the selected graphical user interface item, a location associated with an identified event, a model associated with the identified event, and an object that the actor associated with the identified event accessed or attempted to access.

In another example, in the event a graphical user interface item corresponding to a model was selected at 210, for each identified event, the graphical representation may be updated to depict the relationship between the model associated with the selected graphical user interface item, a location associated with an identified event, an actor associated with the identified event, and an object that the actor associated with the identified event accessed or attempted to access.

In another example, in the event a graphical user interface item corresponding to an object that an actor accessed or attempted to access was selected at 210, for each identified event, the graphical representation may be updated to depict the relationship between the object associated with the selected graphical user interface item, a location associated with an identified event, an actor associated with the identified event, and a model associated with the identified event.

FIG. 3 is a flow diagram illustrating a process for analyzing an event log in accordance with some embodiments. In the example shown, process 300 may be implemented by an event analysis system, such as event analysis system 112. In some embodiments, process 300 is implemented to perform some or all of step 206 of process 200.

At 302, events included in an event log for a particular time frame are provided as input to a plurality of models. For example, a first event may be provided as input to a first model, provided as input to a second model, . . . , and provided as input to an nth model. A second event may be provided as input to the first model, provided as input to the second model, . . . , and provided as input to an nth model. An nth event may be provided as input to the first model, provided as input to the second model, . . . , and provided as input to the nth model. In some embodiments, the events are provided as input to a subset of the plurality of models.

At 304, it is determined whether any of the events are indicative of anomalous behavior based on a corresponding confidence level outputted by each of the plurality of models. An event may be determined to be anomalous in the event a confidence level outputted by one of the models is greater than a confidence level threshold.

At 306, relationships between risk entities are determined for each of the one or more events determined to have a confidence level greater than a confidence threshold. Examples of risk entities include a location, an actor, a model that detected anomalous event associated with the event or group of events, or an object that the actor accessed or attempted to access. The relationship may link a location associated with an event to an actor associated with the event, a model that determined the event to be anomalous, and an object associated with the event that was accessed or attempted to be accessed.

At 308, relationships between different risk entities associated with different determined events are determined. The determined relationships may indicate how each of the determined events relate to each other. For example, the event analysis system may determine that a first event and a second event share the same location and actor, but the first event was detected by a first model and a first object was accessed or attempted to be accessed, and the second event was detected by a second model and a second object was accessed or attempted to be accessed.

As a result of determining the relationships at 306 and 308, the graphical representation of the anomalous events may be depicted as a web of interconnected risk entities.

In some embodiments, when a plurality of risk entities of a first type are associated with the same risk entity of a different type, the measure of anomaly for the same risk entity of the different type corresponds to the highest confidence level among the plurality of risk entities of the first type. For example, a plurality of actors may be associated with events provided as input to a model. Each of the events is associated with a corresponding confidence level. The measure of anomaly for the model corresponds to the highest confidence level of the plurality of confidence levels.

FIG. 4 is a flow diagram illustrating a process for analyzing an event log in accordance with some embodiments. In the example shown, process 400 may be implemented by an event analysis system, such as event analysis system 112. In some embodiments, process 400 is implemented to perform some or all of step 212 of process 200.

At 402, one or more event logs are re-analyzed to identify one or more events associated with a selected graphical user interface item. For example, the selected graphical user interface item may correspond to a location. The one or more event logs may be re-analyzed to identify one or more other events that are associated with the location.

In another example, the selected graphical user interface item may correspond to an actor. The one or more event logs may be re-analyzed to identify one or more other events that associated with the actor.

In another example, the selected graphical user interface item may correspond to a model that detected the anomalous behavior. The one or more logs may be re-analyzed to identify one or more other events determined by the model to have a confidence level greater than a confidence level.

In another example, the selected graphical user interface item may correspond to an object that an actor accessed or attempted to accessed. The one or more logs may be re-analyzed to identify one or more other events associated with the object.

At 404, the one or more identified events are provided as input to each of a plurality of models.

At 406, the one or more identified events having a confidence level greater than a confidence threshold are determined. Each of the plurality of models is configured to output a corresponding confidence level for each of the one or more identified events.

At 408, relationships between risk entities are determined for each of the one or more determined events. Examples of risk entities include a location, an actor, a model that determined the event to be anomalous, or an object that the actor accessed or attempted to access.

For example, in the event the selected graphical user interface item corresponds to a location, a relationship between the location and an actor associated with a first determined event (who performed the event), a model associated with the first determined event (which model detected the anomalous behavior), and an object associated with the first determined event is determined (what object did the actor access or attempt to access).

In the event the selected graphical user interface item corresponds to an actor, a relationship between the actor and a location associated with a second determined event (where did the actor perform the event), a model associated with the second determined event (which model detected the anomalous behavior), and an object associated with the second determined event is determined.

In the event the selected graphical user interface item corresponds to a model that determined an event to be anomalous, a relationship between the model and a location associated with a third determined event, an actor associated with the third determined event, and an object associated with the third determined event is determined.

In the event the selected graphical user interface item corresponds to an object that was accessed or attempted to be accessed, a relationship between the object and a location associated with a fourth determined event, an actor associated with the fourth determined event, and a model associated with the fourth determined event is determined.

At 410, relationships between different risk entities associated with different determined events are determined. The determined relationships may indicate how each of the determined events relate to the selected graphical user interface item.

For example, the selected graphical user interface item may correspond to a location. The event analysis system may determine whether any of the determined events share an actor, a model, or an object that was accessed or attempted to be accessed.

In some embodiments, the event analysis system determines that a plurality of actors associated with the same location accessed or attempted to access the same object.

The selected graphical user interface item may correspond to an actor. The event analysis system may determine whether any of the determined events share a location, a model, or an object that was accessed or attempted to be accessed.

The selected graphical user interface item may correspond to a model. The event analysis system may determine whether any of the determined events share a location, a model, or an object that was accessed or attempted to be accessed.

The selected graphical user interface item may correspond to an object that accessed or attempted to be accessed. The event analysis system may determine whether any of the determined events share a location, an actor, or a model.

As a result of determining the relationships at 408 and 410, the graphical representation of the anomalous events may be depicted as a web of interconnected risk entities.

When a plurality of risk entities of a first type are associated with the same risk entity of a different type, the measure of anomaly for the same risk entity of the different type corresponds to the highest confidence level among the plurality of risk entities of the first type.

FIG. 5 is a flow diagram illustrating a process of training a model in accordance with some embodiments. In the example shown, process 500 may be implemented by an event analysis system, such as event analysis system 112.

At 502, one or more event logs are received. Each event log is comprised of a plurality of entries. Each entry corresponds to an event. Each entry of an event log identifies an event type and one or more attributes associated with the event. Examples of event type include a file deletion, a file access, a file creation, a file move, a directory deletion, a directory creation, a directory move, a system login grant, a system login denial, a user being added, a user being deleted, a file being downloaded, a user password change, change of state, change of status etc. Examples of event attributes include a timestamp, a sequence number, a user to which the event is associated, an object with which the event is associated, an internet protocol address, a location from which the event occurred, etc.

At 504, a machine learning model is trained based on the one or more event logs. The machine learning model is trained to identify a particular type of anomalous behavior. For example, a machine learning model may be trained to determine whether an event or a group of events are indicative of an insider attack, a ransomware attack, a brute force attack, wide access (e.g., log in attempts from different locations), a sensitive data leak, a geo fencing breach, or a combination thereof.

The machine learning model may be a supervised learning machine learning model, a semi-supervised machine learning model, an unsupervised machine learning model, or a reinforcement machine learning model. Examples of machine learning model algorithms include a Naïve Bayes classifier algorithm, K Means clustering algorithm, support vector machine algorithm, linear regression, logistic regression, artificial neural networks, decision trees, random forests, nearest neighbors, etc.

The entries included in the one or more event logs are sorted into training data and validation data. The entries included in the training data are applied a machine learning model. The model is trained using the training data until it has a prediction accuracy greater than a threshold accuracy.

The entries included in the validation data are applied to a trained machine learning model. In the event the trained machine learning model has a prediction accuracy above the threshold, the trained machine learning model is validated and ready for use with production data (e.g., event logs from primary systems 102a, 102n). Otherwise, the machine learning model is retrained and revalidated to produce a more accurate machine learning model.

At 506, a plurality of events included in one or more event logs are applied to the machine learning model. The machine learning model outputs a corresponding confidence level that indicates whether one or more events corresponding to the one or more event log entries are anomalous. A model may determine that an event is anomalous in the event a confidence level associated with the event is greater than a confidence level threshold.

At 508, feedback is received. A graphical user interface that provides a graphical representation of an event determined to be an anomalous event is provided to a client device. A user associated with the client device may provide, via the graphical user interface, feedback regarding a risk entity associated with an anomalous event. For example, the graphical representation may indicate a risk entity is a medium-risk entity. The received feedback (e.g., clicking ignore on the graphical user interface item corresponding to the risk entity) may indicate that the risk entity is a low-risk entity.

At 510, the machine learning model is retrained based on the feedback.

Figure 6A:
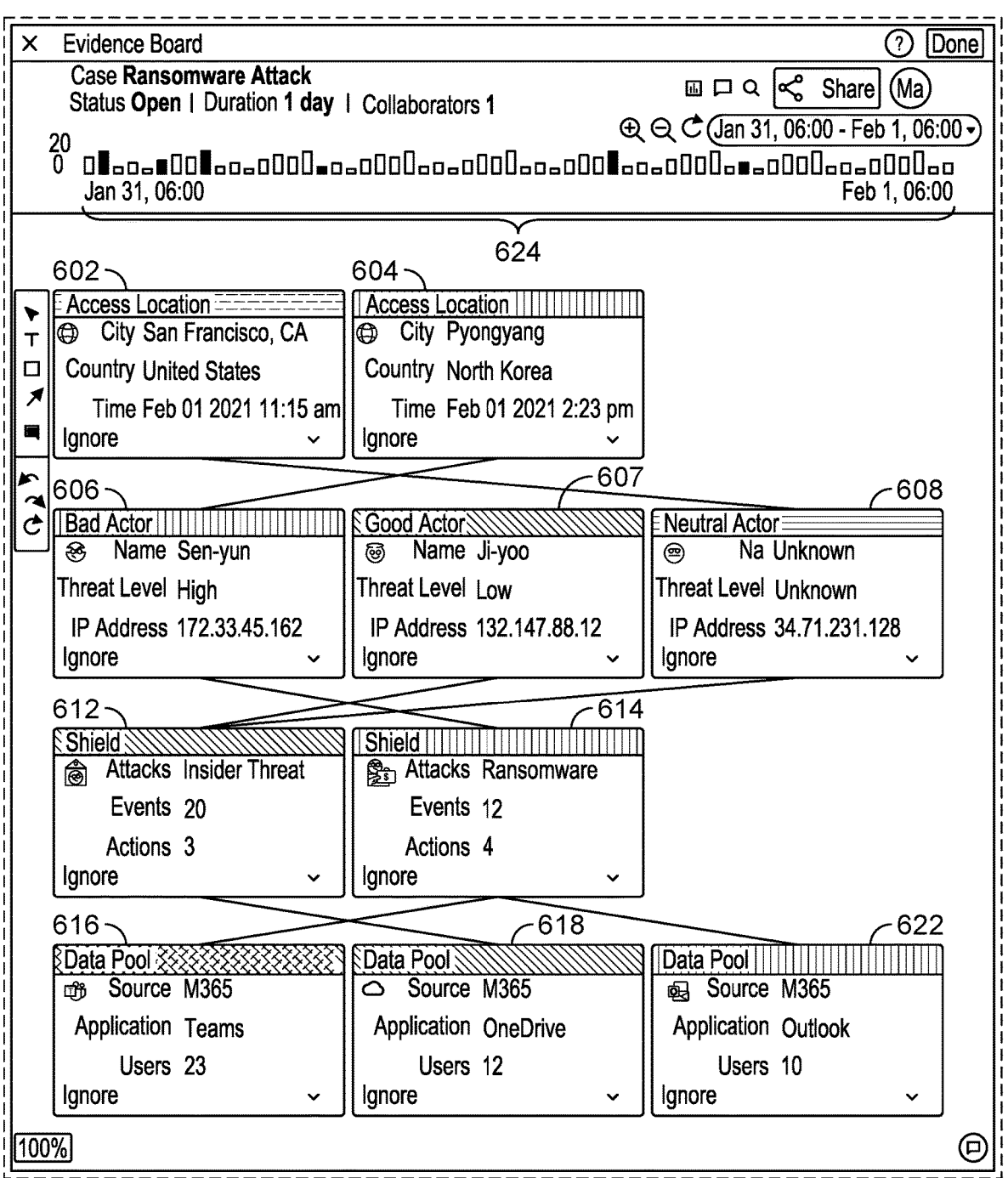
FIG. 6A-6N are examples of a graphical user interface in accordance with some embodiments.

FIG. 6A-6N are examples of a graphical user interface in accordance with some embodiments. Graphical user interface 600 provides a graphical representation of risk entities associated with four different events occurring within a time frame 624.

A visual representation of a first event depicts the relationship between the risk entities associated with the first event. Graphical user interface item 602 corresponding to a location of "San Francisco, CA" is linked to graphical user interface item 608 corresponding to an "unknown" actor, which is linked to a graphical user interface item 612 corresponding to a model that detected an event to be anomalous, which is linked to a graphical user interface item 618 corresponding to an object accessed or attempted to be accessed by the "unknown" actor.

A visual representation of a second event includes graphical user interface item 604 corresponding to a location of "Pyongyang, North Korea" linked to graphical user interface item 606 corresponding to an actor named "Sen-yun," which is linked to a graphical user interface item 614 corresponding to a model that detected an event to be anomalous, which is linked to graphical user interface item 616 corresponding to an object accessed or attempted to be accessed by the actor named "Sen-Yun."

A visual representation of a third event includes graphical user interface item 604 corresponding to a location of "Pyongyang, North Korea" linked to graphical user interface item 606 corresponding to an actor named "Sen-yun," which is linked to graphical user interface item 614 corresponding to a model that detected an event to be anomalous, which is linked to graphical user interface item 622 corresponding to an object accessed or attempted to be accessed by the actor named "Sen-Yun."

A visual representation of a fourth event includes graphical user interface item 607 corresponding to an actor named "Ji-yoo" linked to graphical user interface item 612 corresponding to a model that detected an event to be anomalous, which is linked to graphical user interface item 618 corresponding to an object accessed or attempted to be accessed by the actor named "Ji-yoo."

Each of the graphical user interface items has a corresponding measure of anomaly. For example, graphical user interface items 604, 606, 614, 622 have a red header. When a plurality of risk entities of a first type are associated with the same risk entity of a different type, the measure of anomaly for the same risk entity of the different type anomaly for the same risk entity of the different type corresponds to the highest confidence level among the plurality of risk entities of the first type. This indicates that the risk entities are high-risk entities. Graphical user interface item 616 has an orange header. This indicates that the risk entity is a medium-risk entity. Graphical user interface items 608, 612, 618 have a green header. This indicates that the risk entities are low-risk entities. Graphical user interface item 602 has a gray header. Graphical user interface item 608 has blue header. This indicates that the risk entity is neutral.

Figure 6B:
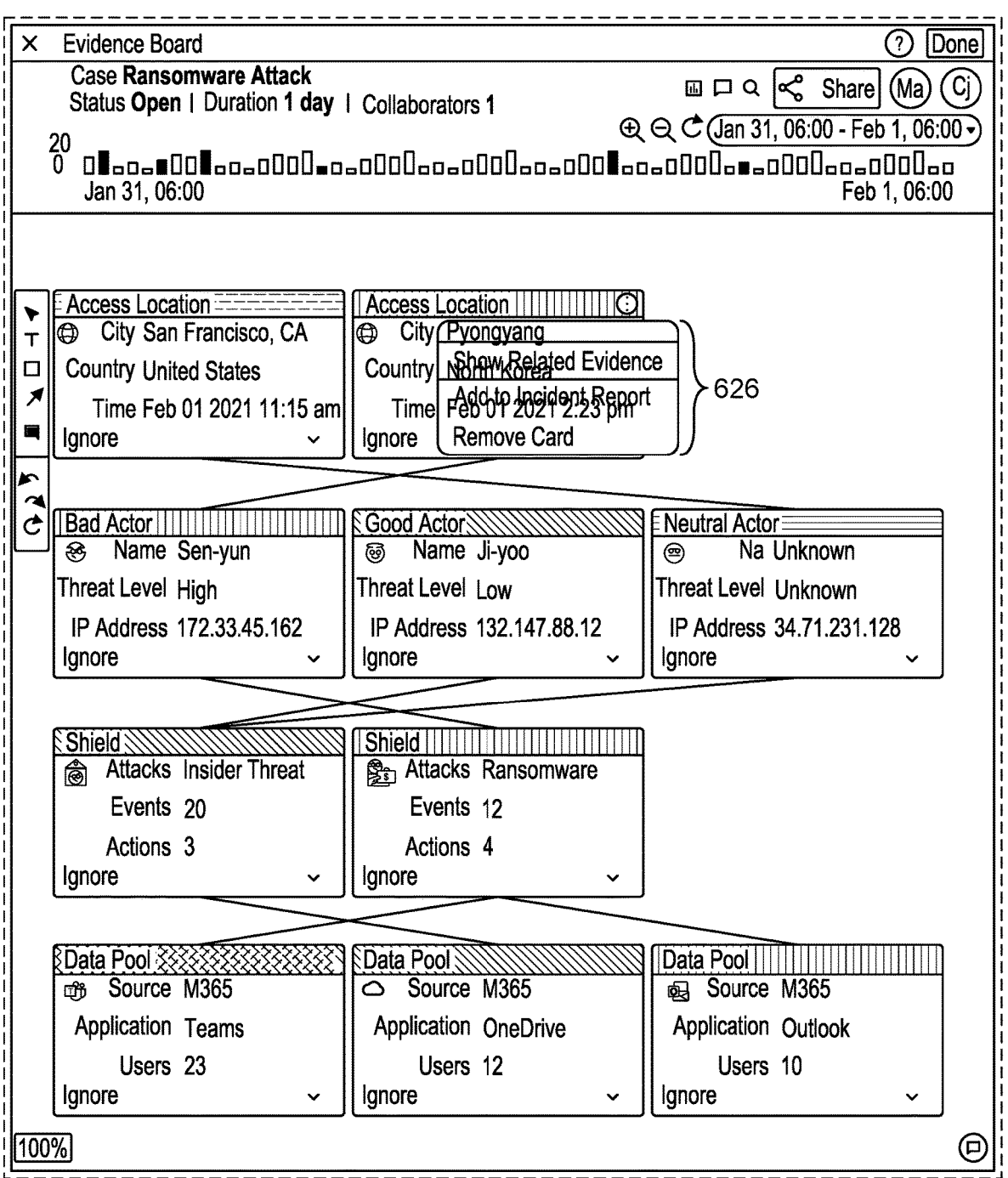

A user may select any of the graphical user interface items. FIG. 6B illustrates a selection of graphical user interface item 604. For example, a user may provide an input to graphical user interface 605, such as right-clicking on graphical user interface item 604. In response to the input, graphical user interface 605 provides a menu 626 having an option to "show related evidence," an option to "add to incident report," and an option to "remove card."

Figure 6C:
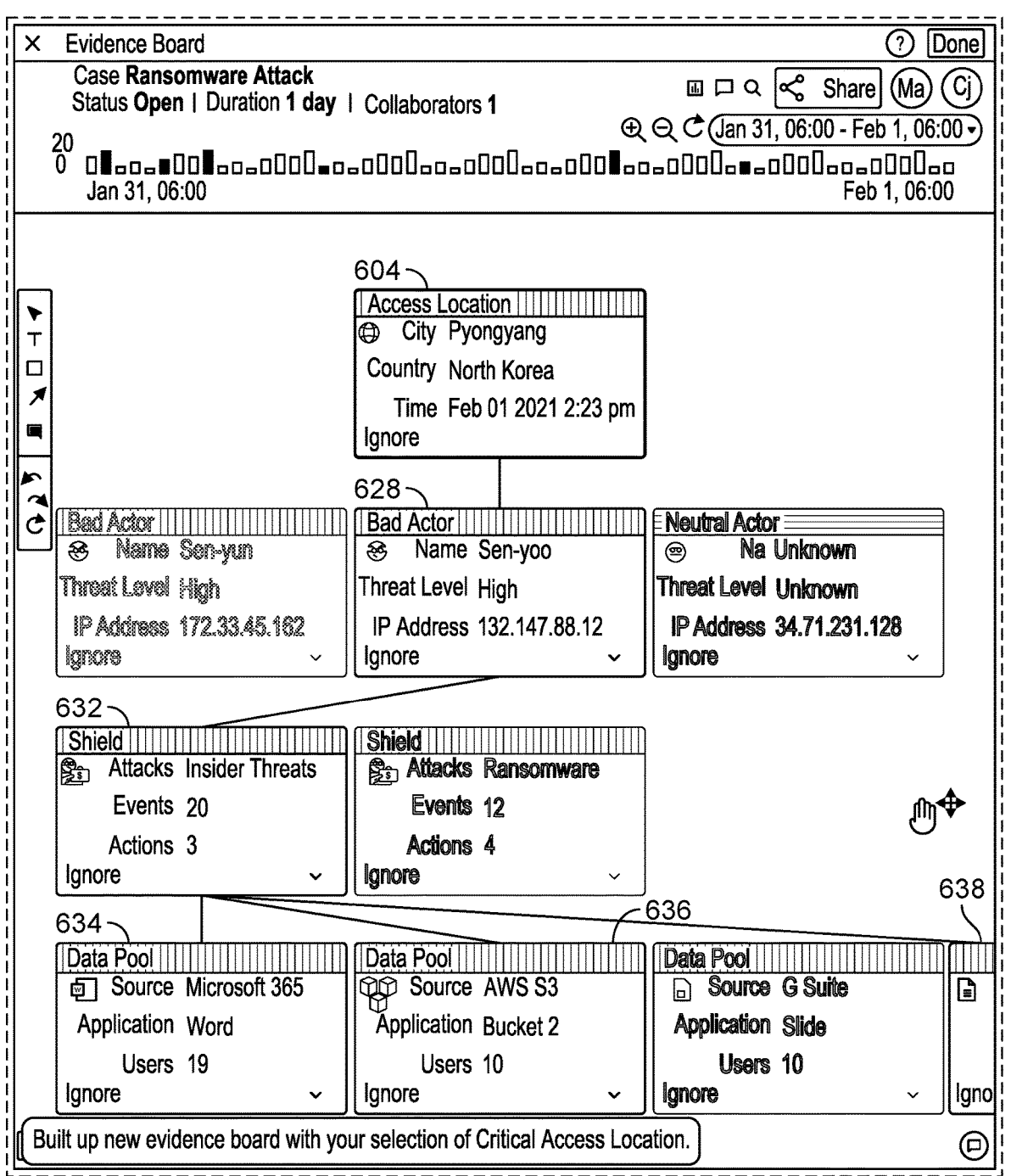

FIG. 6C illustrates a selection of "show related evidence." In response to the selection, graphical user interface 605 is updated to be graphical user interface 610. The event analysis system analyzes one or more event logs to identify, if any, related to the location of "Pyongyang."

Graphical user interface 610 depicts the relationship between a location of "Pyongyang" and the identified events.

A visual representation of a first related event depicts the relationship between the risk entities associated with the first related event. Graphical user interface item 604 corresponding to a location of "Pyongyang" is linked to graphical user interface item 628 corresponding to an actor named "Sen-yoo," which is linked to a graphical user interface item 632 corresponding to a model that detected an event to be anomalous, which is linked to a graphical user interface item 634 corresponding to an object accessed or attempted to be accessed by the actor named "Sen-yoo."

A visual representation of a second related event depicts the relationship between the risk entities associated with the second related event. Graphical user interface item 604 corresponding to a location of "Pyongyang" is linked to graphical user interface item 628 corresponding to an actor named "Sen-yoo," which is linked to a graphical user interface item 632 corresponding to a model that detected an event to be anomalous, which is linked to a graphical user interface item 636 corresponding to an object accessed or attempted to be accessed by the actor named "Sen-yoo."

A visual representation of a third related event depicts the relationship between the risk entities associated with the third related event. Graphical user interface item 604 corresponding to a location of "Pyongyang" is linked to graphical user interface item 628 corresponding to an actor named "Sen-yoo," which is linked to a graphical user interface item 632 corresponding to a model that detected an event to be anomalous, which is linked to a graphical user interface item 638 corresponding to an object accessed or attempted to be accessed by the actor named "Sen-yoo."

Graphical user interface 610 also depicts the relationships between different risk entities associated with different determined events. In the example shown, the first, second, and third related events share the same location, actor, and model that determined the events associated with the actor to be anomalous.

Figure 6D:
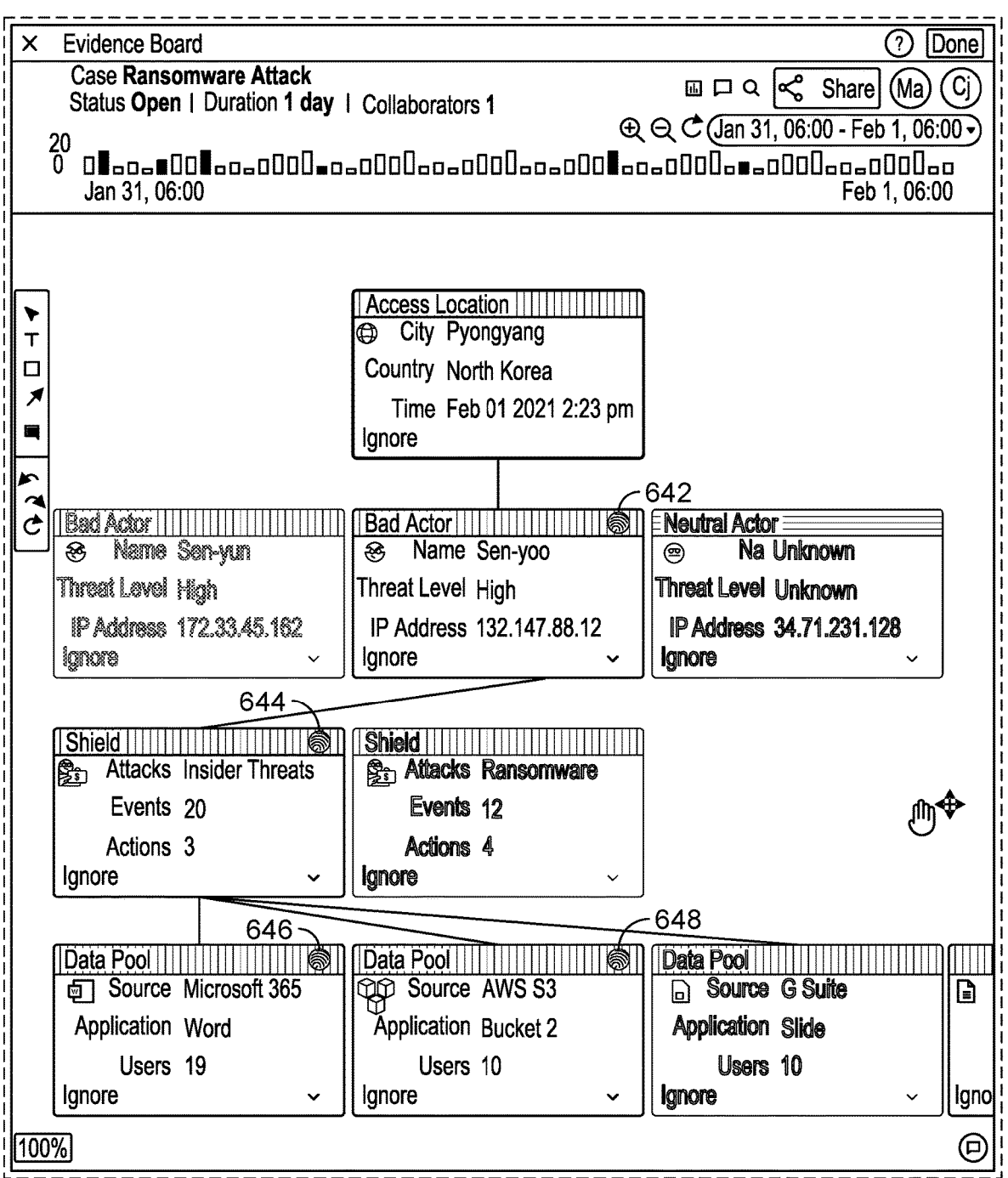

FIG. 6D illustrates the risk entities associated with the relevant event being added to a database of high-risk entities. Risk entities are being marked as evidence of anomalous events. This is illustrated by fingerprint icons 642, 644,

646, 648. These risk entities will remain in the graphical user interface when parameters, such as time frame 624, are changed.

Figure 6E:
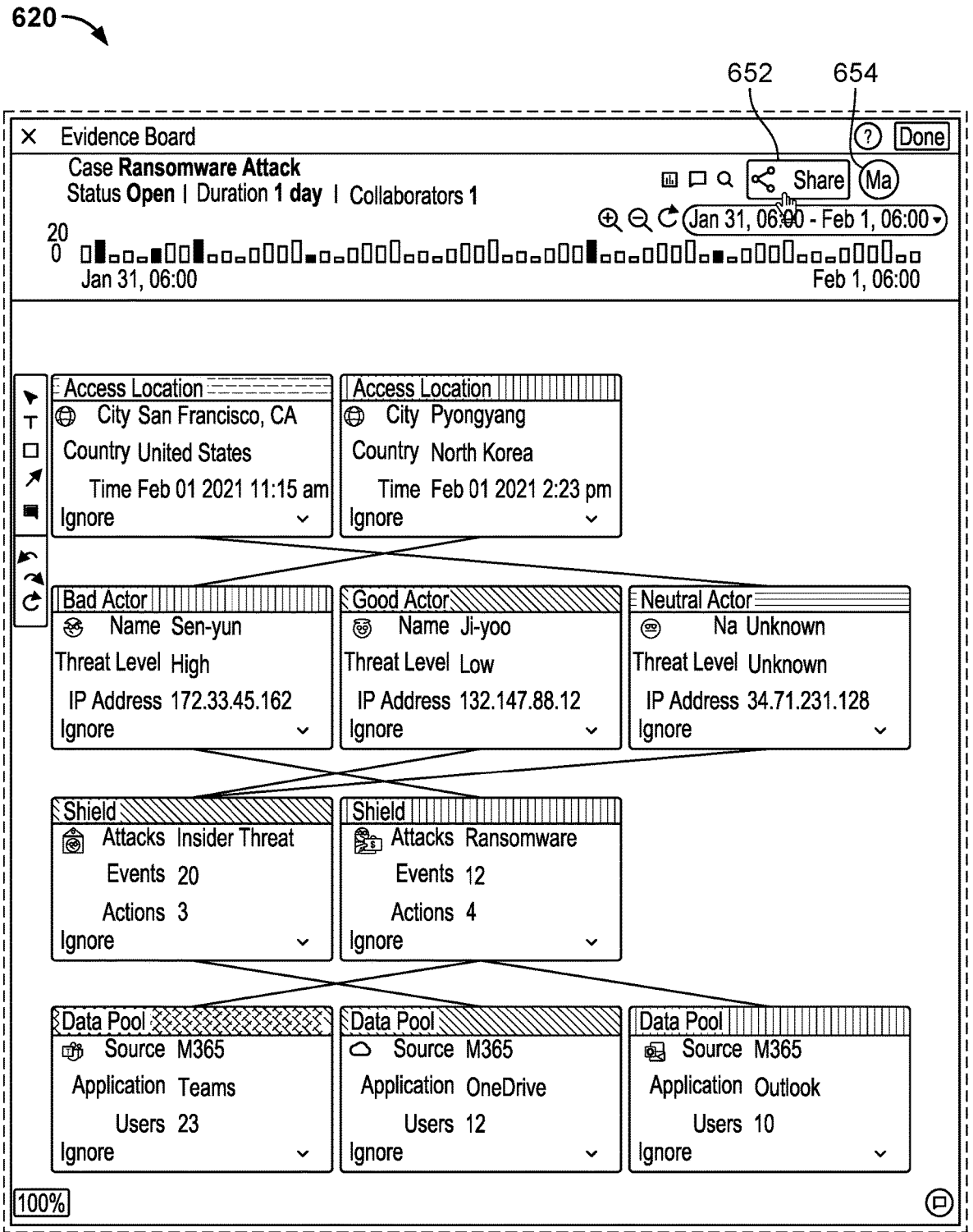
Figure 6G:
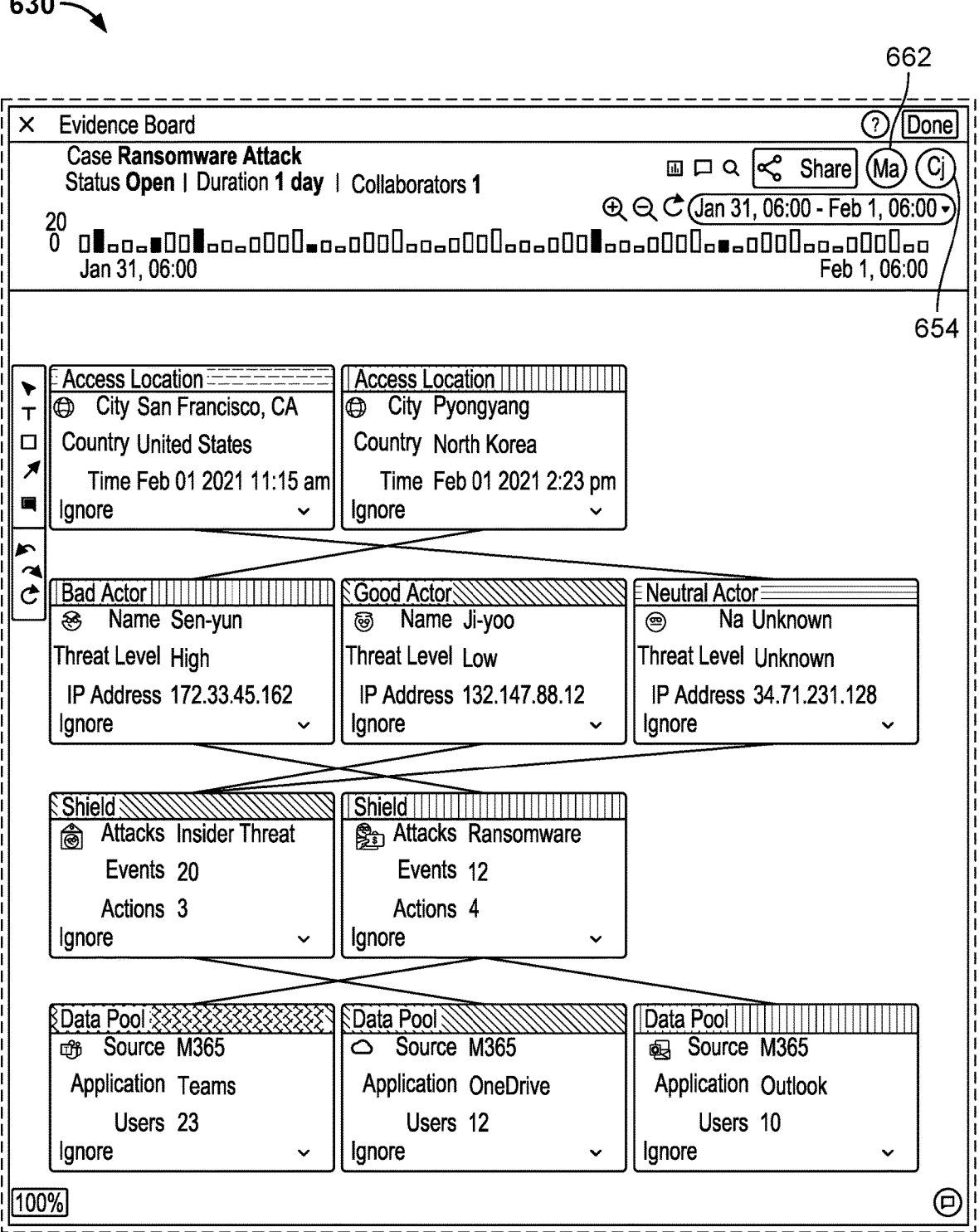

FIG. 6E illustrates user 654 may share graphical user interface 620 via share button 652. In response to receiving a selection of share button 652, as seen in FIG. 6F, an overlay page 656 is depicted in graphical user interface 625. A user may specify contact information (e.g., email address, phone number, etc.) of another user and a description of the evidence board. Overlay page 656 includes a create button 658. In response to receiving a selection of create button 658, a link associated the evidence board is provided to the contact information provided in overlay page 656. As seen in FIG. 6G, the evidence board has been shared with user 662, which may collaborate with user 654.

Figure 6H:
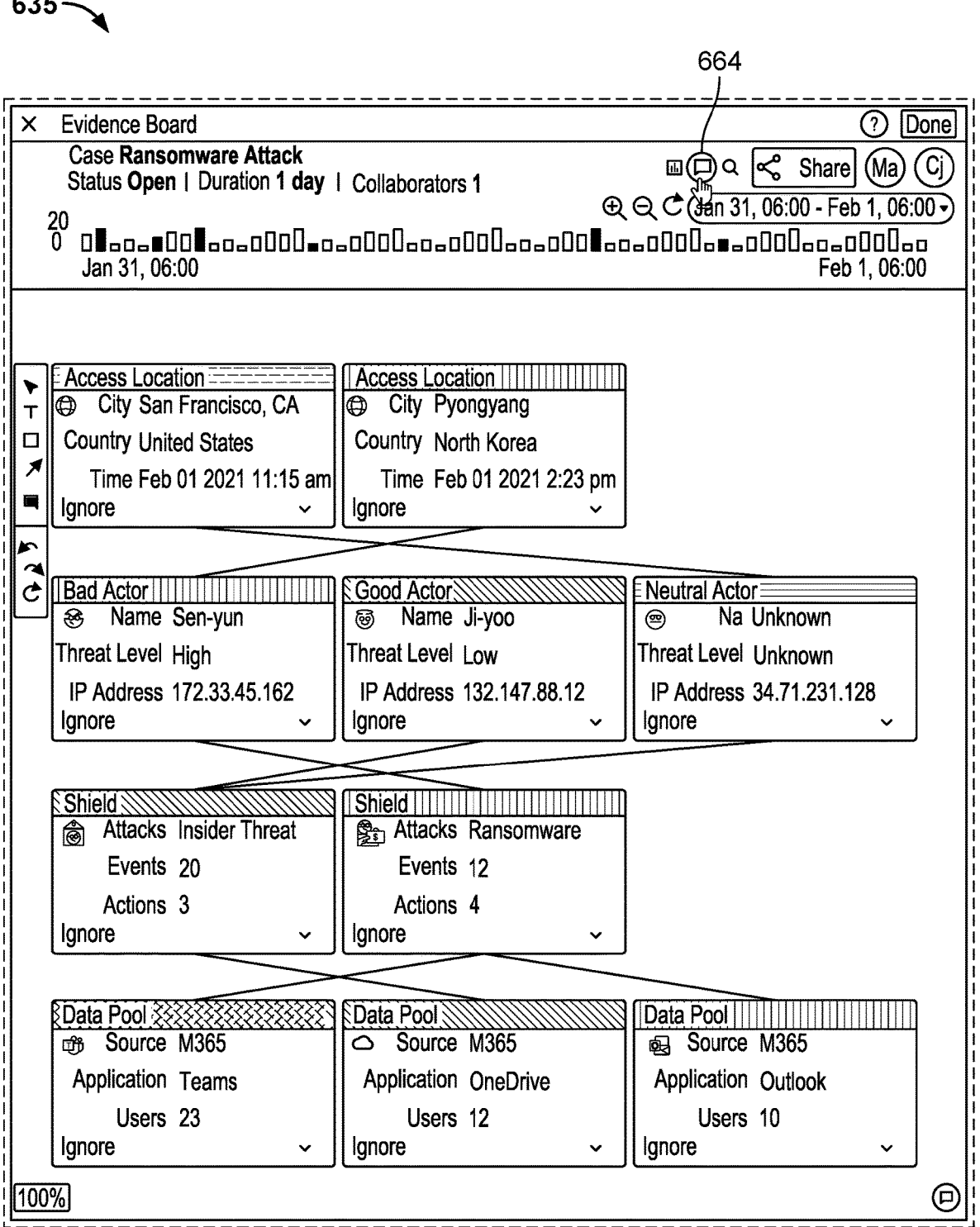

FIG. 6H depicts graphical user interface 635 having a chat button 664. In response to a selection of chat button 664, as seen in FIG. 6I, two or more collaborating users may communicate via chat window 666.

Figure 6J:
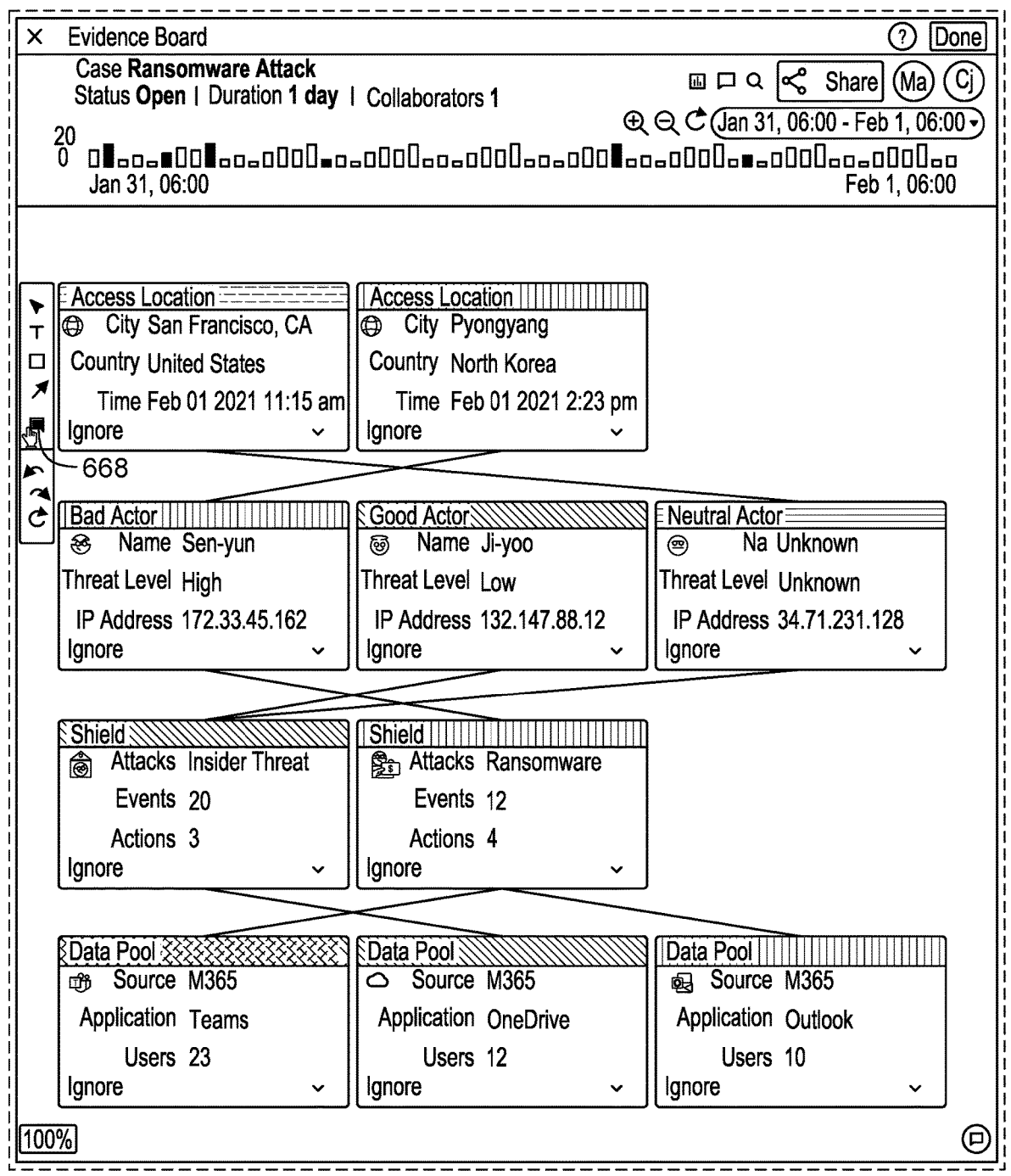

FIG. 6J depicts graphical user interface 645 having a comment button 668. In response to a selection of comment button 668, a user may leave a comment for any of the graphical user interface items. As seen in FIG. 6K, a user has made comments 672, 674, 676.

Figure 6L:
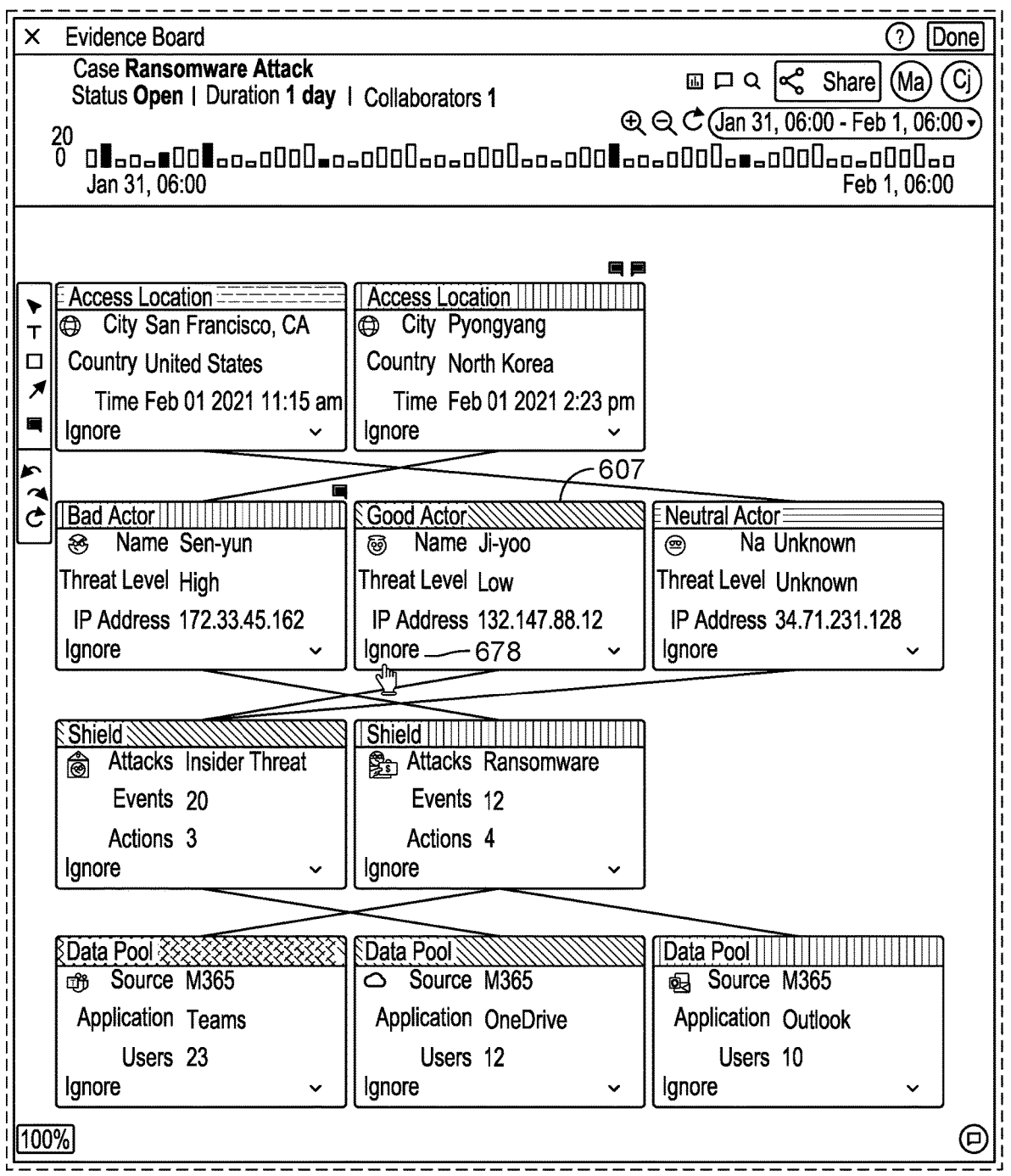
Figure 6M:
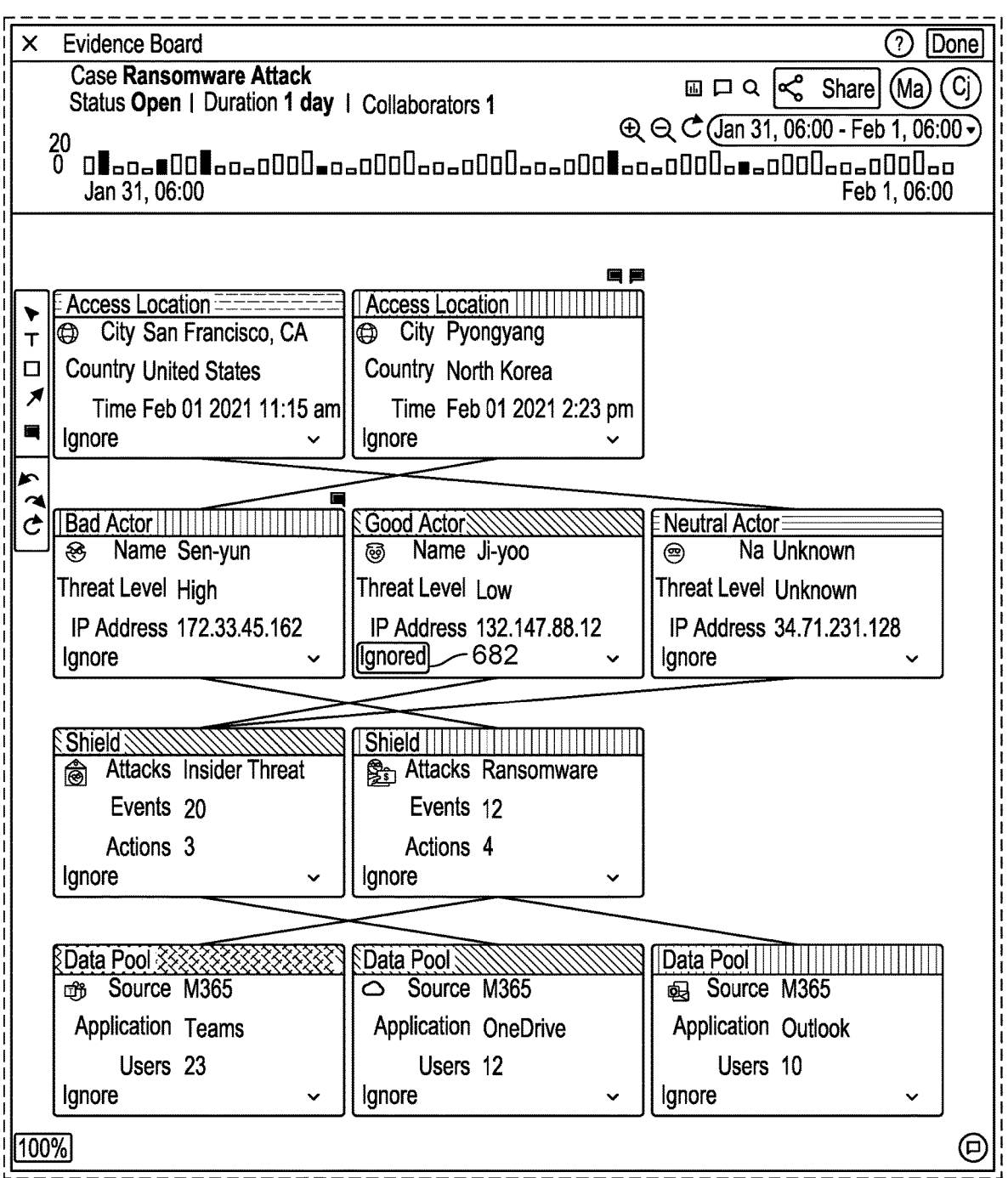

The graphical representation of risk entities associated with a detected anomalous event is reviewed by a user associated with a client device. The user may review the risk entities and determine whether to ignore an anomalous event. Each of the graphical user interface items 602, 604, 606, 607, 608, 612, 614, 616, 618, 622 may be ignored by the user. As seen in FIG. 6L, the user is selecting to ignore graphical user interface item 607. In response to the selection, as seen in FIG. 6M, graphical user interface item 607 has been ignored 682 by the user. As seen in FIG. 6N, the user has ignored graphical user interface items 607, 608, 612, 618. Graphical user interface 665 illustrates these graphical user interface items being ignored by changing "Ignore" on the graphical user interface item to be "Ignored." The "Ignored" text 682, 684, 686, 688 is highlighted in white to indicate that a graphical user interface item has been ignored.

This feedback may be used by the event analysis system to re-train one or more of its models.

FIG. 7A illustrates an example of a graphical user interface in accordance with some embodiments. In the example shown, graphical user interface 700 illustrates a report that summarizes and describes one of the events detected by the event analysis system. The report may include a summary section that includes a description 704 of the event. The report may be automatically generated based on risk entities that are marked as evidence, for example, risk entities 642, 644, 646, 648 as seen in FIG. 6D. Information associated with the risk entities is included in the report. Notes may be added to risk entities 642, 644, 646, 648 and included in the report.

The report may include sections corresponding to the different risk entities. A section may include a description associated with a risk entity 706, 712, access logs 708, 710 that indicate the event is anomalous, and notes 710 associated with the risk entity.

Figure 7B:
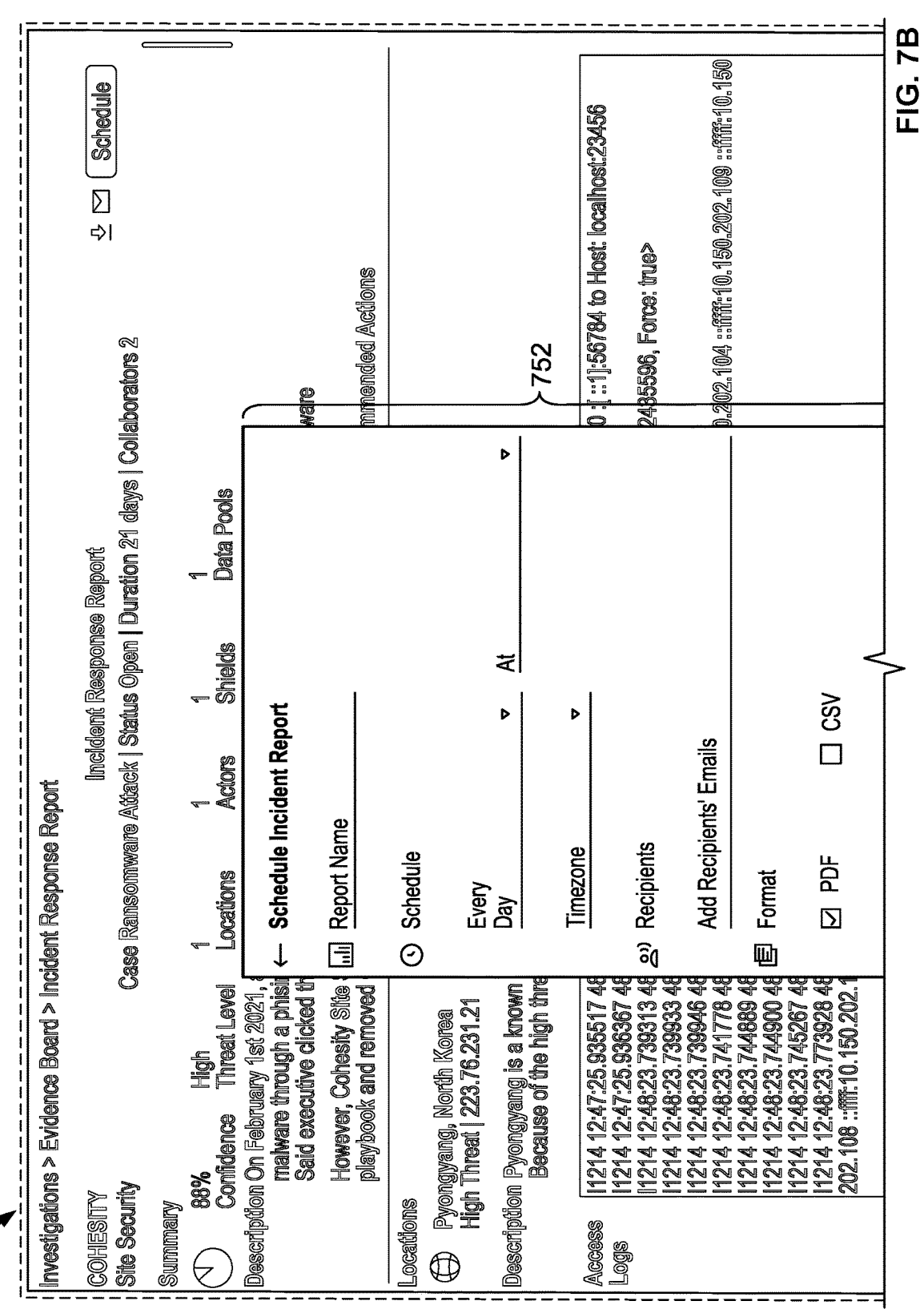
FIG. 7B is an example of a graphical user interface in accordance with some embodiments.
Figure 7B:
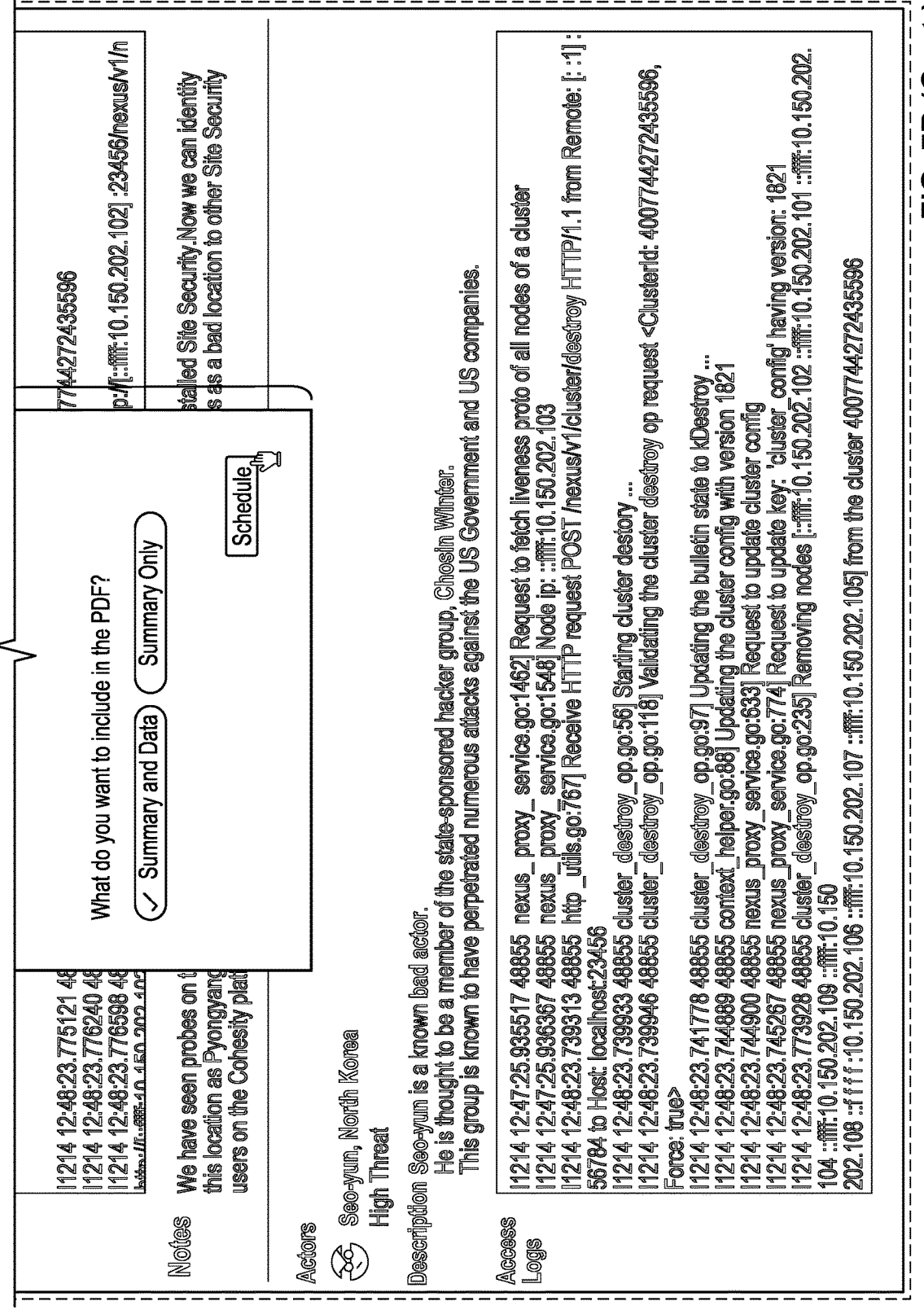

Graphical user interface 700 includes a schedule button 702. In response to a selection of schedule button 702, as seen in FIG. 7B, an overlay page 752 is provided to the user via graphical user interface 750. The overlay page may enable the user to name the report, schedule the report, add contact information of recipients of the report, and an export format.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:

receiving, by a graphical user interface of a computing system, an indication of a graphical user interface item corresponding to a first risk entity among a plurality of graphical user items corresponding to a plurality of different risk entities;

in response to receiving the indication, identifying, by the computing system and based on one or more event logs, one or more events associated with the first risk entity corresponding to the graphical user interface item;

applying, by the computing system, an input associated with the one or more identified events to one or more machine learning models to generate an output including a corresponding measure of anomaly for the one or more identified events;

causing, by the computing system, the graphical user interface to provide the corresponding measure of anomaly for the one or more identified events, wherein for a specific identified event included in the one or more identified events, the graphical user interface provides a visual representation indicating a relationship between a plurality of risk entities associated with the specific identified event as a web of interconnected risk entities of different types, wherein the different types include two or more of an actor type, a location type, a machine learning model type, and an object type, and wherein at least one of the plurality of risk entities associated with the specific identified event corresponds to at least one of the one or more machine learning models that determined the specific identified event to be anomalous;

determining, by the computing system, and when determining the relationship, a particular relationship between the at least one of the or more machine learning models that determined the specific identified event to be anomalous and a location at which the specific identified event occurred; and causing, by the computing system, the graphical user interface to present the visual representation indicating the relationship to include the particular relationship.

2. The method of claim 1, wherein identifying the one or more events comprises applying, by the computing system, the one or more machine learning models to analyze the one or more event logs.

3. The method of claim 1, wherein the indication of the graphical user interface item comprises feedback associated with the first risk entity, the method further comprising retraining, by the computing system, the one or more machine learning models based on the feedback.

4. The method of claim 3, further comprising training, by the computing system and using training data comprising the one or more event logs, the one or more machine learning models to generate the output including the corresponding measure of anomaly for the one or more identified events.

5. The method of claim 4, wherein the corresponding measure of anomaly is anomalous behavior selected from one or more of: an insider attack, a ransomware attack, a brute force attack, a wide access, a sensitive data leak, or a geo fencing breach.

6. The method of claim 1, wherein the first risk entity is a risk entity selected from one or more of: the actor type, the location type, or the object type.

7. The method of claim 1, wherein the corresponding measure of anomaly for the one or more identified events is based on a confidence level of the one or more machine learning models.

8. The method of claim 1, wherein the corresponding measure of anomaly for the one or more identified events is associated with a particular period of time.

9. A computing system comprising:

a memory storing instructions;

processing circuitry that executes the instructions to:

receive, by a graphical user interface, an indication of a graphical user interface item corresponding to a first risk entity among a plurality of graphical user items corresponding to a plurality of different risk entities;

in response to receiving the indication, identify, based on one or more event logs, one or more events associated with the first risk entity corresponding to the graphical user interface item;

apply an input associated with the one or more identified events to one or more machine learning models to generate an output including a corresponding measure of anomaly for the one or more identified events; and cause the graphical user interface to provide the corresponding measure of anomaly for the one or more identified events, wherein for a specific identified event included in the one or more identified events, the graphical user interface provides a visual representation indicating a relationship between a plurality of risk entities associated with the specific identified event as a web of interconnected risk entities of different types, wherein the different types include two or more of an actor type, a location type, a machine learning model type, and an object type, and wherein at least one of the plurality of risk entities associated with the specific identified event corresponds to at least one of the one or more machine learning models that determined the specific identified event to be anomalous;

determine and when determining the relationship, a particular relationship between the at least one of the or more machine learning models that determined the specific identified event to be anomalous and a location at which the specific identified event occurred; and cause the graphical user interface to present the visual representation indicating the relationship to include the particular relationship.

10. The computing system of claim 9, wherein to identify the one or more events, the processing circuitry executes the instructions to apply the one or more machine learning models to analyze the one or more event logs.

11. The computing system of claim 9, wherein:

the indication of the graphical user interface item comprises feedback associated with the first risk entity; and the processing circuitry executes the instructions to retrain the one or more machine learning models based on the feedback.

12. The computing system of claim 11, wherein the processing circuitry executes the instructions to train, using training data comprising the one or more event logs, the one or more machine learning models to generate the output including the corresponding measure of anomaly for the one or more identified events.

13. The computing system of claim 12, wherein the corresponding measure of anomaly is anomalous behavior selected from one or more of: an insider attack, a ransomware attack, a brute force attack, a wide access, a sensitive data leak, or a geo fencing breach.

14. The computing system of claim 9, wherein the first risk entity is a risk entity selected from one or more of: the actor type, the location type, or the object type.

15. The computing system of claim 9, wherein the corresponding measure of anomaly for the one or more identified events is based on a confidence level of the one or more machine learning models.

16. The computing system of claim 9, wherein the corresponding measure of anomaly for the one or more identified events is associated with a particular period of time.

17. Non-transitory computer-readable storage media comprising instructions that, when executed, cause processing circuitry of a computing system to:

receive, by a graphical user interface, an indication of a graphical user interface item corresponding to a first risk entity among a plurality of graphical user items corresponding to a plurality of different risk entities;

in response to receiving the indication, identify, based on one or more event logs, one or more events associated with the first risk entity corresponding to the graphical user interface item;

apply an input associated with the one or more identified events to one or more machine learning models to generate an output including a corresponding measure of anomaly for the one or more identified events; and cause the graphical user interface to provide the corresponding measure of anomaly for the one or more identified events, wherein for a specific identified event included in the one or more identified events, the graphical user interface provides a visual representation indicating a relationship between a plurality of risk entities associated with the specific identified event as a web of interconnected risk entities of different types, wherein the different types include two or more of an actor type, a location type, a machine learning model type, and an object type, and wherein at least one of the plurality of risk entities associated with the specific identified event corresponds to at least one of the one or more machine learning models that determined the specific identified event to be anomalous;

determine and when determining the relationship, a particular relationship between the at least one of the or more machine learning models that determined the specific identified event to be anomalous and a location at which the specific identified event occurred; and cause the graphical user interface to present the visual representation indicating the relationship to include the particular relationship.

18. The non-transitory computer-readable storage media of claim 17, wherein to identify the one or more events, the instructions, when executed, cause the processing circuitry to apply the one or more machine learning models to analyze the one or more event logs.

* * * * *